US010859693B1

(12) United States Patent
Sabripour et al.

(10) Patent No.: US 10,859,693 B1
(45) Date of Patent: Dec. 8, 2020

(54) INTELLIGENT BEAM FORMING FOR A RANGE DETECTION DEVICE OF A VEHICLE

(71) Applicant: MOTOROLA SOLUTIONS, INC., Chicago, IL (US)

(72) Inventors: Shervin Sabripour, Plantation, FL (US); Patrick D. Koskan, Jupiter, FL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 16/513,527

(22) Filed: Jul. 16, 2019

(51) Int. Cl.
*G01S 13/931* (2020.01)
*G01S 13/04* (2006.01)
*G01S 13/02* (2006.01)

(52) U.S. Cl.
CPC ............ *G01S 13/931* (2013.01); *G01S 13/04* (2013.01); *G01S 2013/0254* (2013.01); *G01S 2013/9315* (2020.01); *G01S 2013/9322* (2020.01); *G01S 2013/9329* (2020.01)

(58) Field of Classification Search
CPC ......... G01S 13/9323; G01S 2013/9324; G01S 13/931; G01S 13/04; G01S 13/56; G01S 13/06; G01S 2013/9329; G01S 2013/0245; G01S 2013/0254; G01S 2013/0263; G01S 213/0272; B60Q 1/143; B60Q 1/085
USPC ........................................................ 340/435
See application file for complete search history.

(56) References Cited

U.S. PATENT DOCUMENTS

| 8,761,477 | B2 | 6/2014 | Walker et al. | |
|---|---|---|---|---|
| 10,215,860 | B2 | 2/2019 | Hassenpflug et al. | |
| 2008/0272955 | A1 | 11/2008 | Yonak et al. | |
| 2009/0251530 | A1* | 10/2009 | Cilia | G07C 5/0866 348/39 |
| 2010/0253597 | A1* | 10/2010 | Seder | G08G 1/165 345/7 |
| 2016/0003938 | A1 | 1/2016 | Gazit et al. | |
| 2017/0254880 | A1 | 9/2017 | Smith | |
| 2017/0297568 | A1* | 10/2017 | Kentley | G09G 5/363 |
| 2018/0105039 | A1 | 4/2018 | Yeomans | |
| 2018/0348343 | A1* | 12/2018 | Achour | H01Q 3/44 |
| 2019/0033439 | A1 | 1/2019 | Gu et al. | |

(Continued)

OTHER PUBLICATIONS

International Search Report and Written Opinion for Application No. PCT/US2020/042151 dated Oct. 20, 2020 (16 pages).

*Primary Examiner* — Emily C Terrell
(74) *Attorney, Agent, or Firm* — Michael Best & Friedrich LLP

(57) ABSTRACT

Intelligent beam forming for a range detection device of a vehicle. One system includes a range detection device including a detection array, and an electronic processor communicatively coupled to the detection array. The electronic processor is configured to receive image or video data from a camera having a field of view. The electronic processor is further configured to identify an area in the field of view of the camera, determine a first threat probability of the identified area, and determine that the first threat probability is greater than a threat level threshold. In response to determining that the first threat probability is greater than the threat level threshold, the electronic processor is configured to provide an instruction to the detection array to change a shape of a beam created by the detection array to focus the beam in a direction of the identified area.

20 Claims, 10 Drawing Sheets

(56) References Cited

U.S. PATENT DOCUMENTS

2019/0128998 A1* 5/2019 Josefsberg ............ G01S 13/867
2019/0137601 A1 5/2019 Driscoll et al.
2019/0277962 A1 9/2019 Ingram et al.
2019/0383904 A1* 12/2019 Harrison .............. G06K 9/4628

* cited by examiner

INTELLIGENT BEAM FORMING FOR A RANGE DETECTION DEVICE OF A VEHICLE

BACKGROUND OF THE INVENTION

First responders and other types of users, such as private security personnel, may be under a threat of physical harm and safety based on their position and/or function. This is especially true when the first responder is within or nearby his or her vehicle and has his or her attention focused on other activities, such as writing incident reports, researching case or offender information via personal or vehicular electronic devices, or canvassing an incident scene for clues or evidence. As a result, the first responder may not be alert and may be more likely to inadvertently subject himself or herself to an unsafe situation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
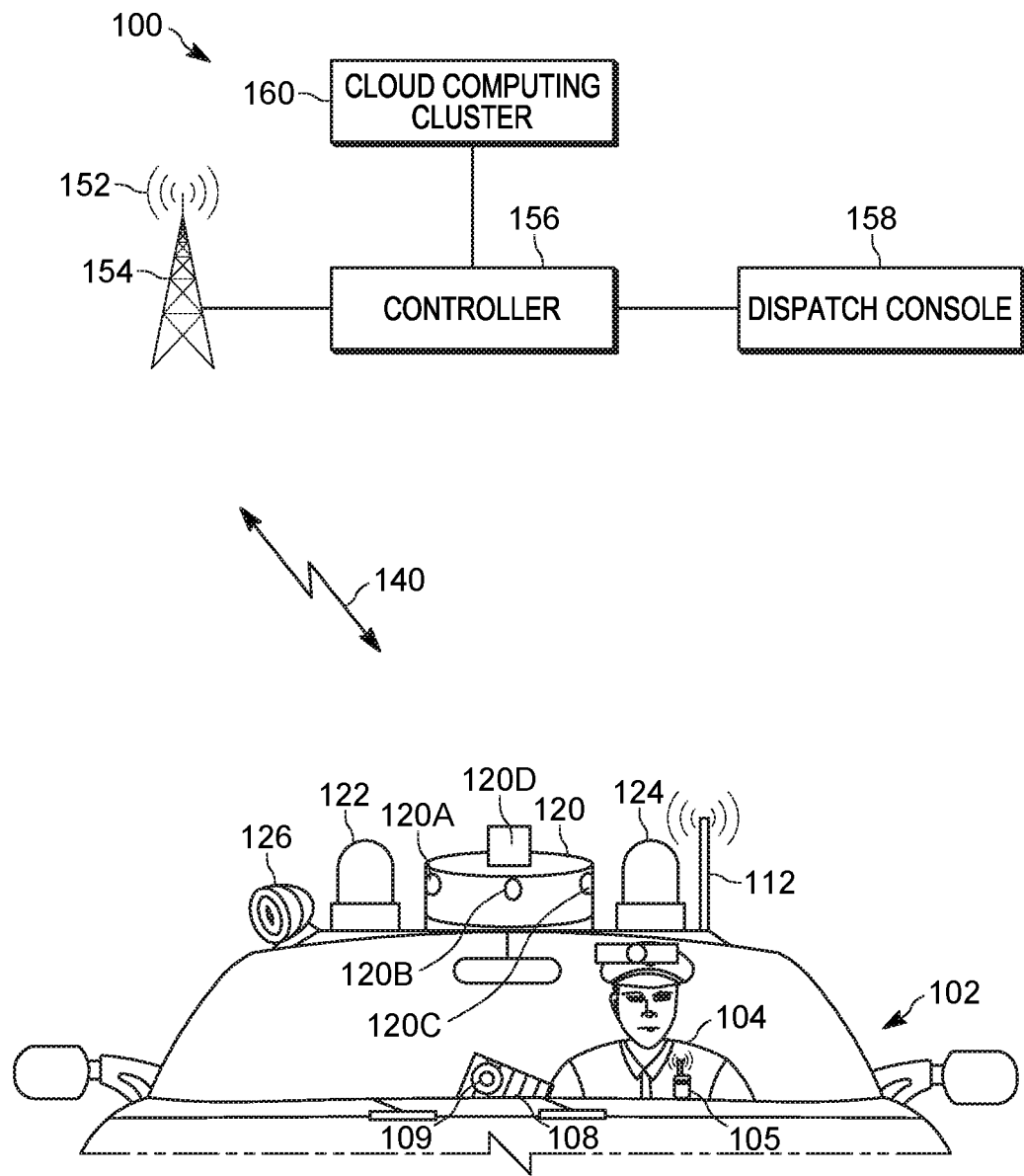
FIG. 1 is a system diagram illustrating a system for enabling a wide-angle (for example, 360-degree) threat detection sensor system to monitor an area of interest surrounding a vehicle, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Officers responding to an incident may park their vehicles in a variety of positions, for instance, to establish a perimeter surrounding an incident area, or to focus their attention on activities such as writing an incident report. As mentioned above, when the officer is within or nearby his or her vehicle and has his or her attention focused on other activities, the officer may subject himself/herself to unsafe situation due to approaching threats. During such situations, vehicle-based sensor systems can be enabled to monitor an area surrounding the vehicle and further alert the officer about approaching threats. However, the likelihood of a threat originating from different areas surrounding the vehicle may not be the same and therefore some areas surrounding the vehicle may be of higher interest for monitoring and detecting threats. For example, an area with a protected space that provides a direct travel path toward the vehicle may have a higher likelihood of a threat originating from that area as compared to other areas surrounding the vehicle (e.g., see FIGS. 5A and 7A). Existing range detection devices used on vehicles emit a beam in a general direction where the range detection device is facing such that all/most areas within the coverage area of the range detection device receive approximately the same amount of range detection waves from the emitted beam (e.g., see wide band beam patterns of FIGS. 4B and 6B). In other words, low threat probability areas receive the same or a similar amount of range detection beam coverage as high threat probability areas. Thus, there is a technological problem with respect to how range detection devices used on vehicles with changing monitored areas output range detection beams to monitor for potential threats around the vehicle.

Disclosed are, among other things, a method, device, and system for one or more electronic processors to provide intelligent range detection beam forming for a range detection device of a vehicle. In some embodiments, one or more electronic processors provide intelligent range detection beam forming by identifying an area in a field of view of a camera, determining that a threat probability of the identified area is above a predetermined threshold, and changing a shape of a beam emitted by the range detection device to focus the beam in a direction of the identified area. In some embodiments, the disclosed method, device, and system address the above-noted technological problem by extending a measurable range of the range detection device in the direction of the identified high threat probability area and/or by reducing the measurable range of the range detection device in a second direction different from the direction of the identified high threat probability area. Accordingly, the range detection device may be able to detect potential threats more quickly (e.g., due to extending the measurable range of the range detection device) and/or may be able to more accurately detect potential threats (e.g., by reducing false positives of detected objects in crowded areas or in areas less likely to produce threats).

One embodiment provides a detection system control device including a range detection device including a detection array. The detection system control device includes one or more electronic processors communicatively coupled to the detection array. The one or more electronic processors are configured to receive data from a camera. The camera includes a field of view, and the data includes at least one of an image and a video. The one or more electronic processors are further configured to identify a first area in the field of view of the camera, and determine a first threat probability of the first identified area. The one or more electronic processors are further configured to determine that the first threat probability is greater than a threat level threshold. In response to determining that the first threat probability is greater than the threat level threshold, the one or more electronic processors are further configured to provide an instruction to the detection array to change a shape of a beam created by the detection array to focus the beam in a direction of the first identified area. In response to receiving the instruction, the detection array emits the beam with the changed shape to focus the beam in the direction of the first identified area.

Another embodiment provides a method of controlling a detection system. The method includes receiving, with one or more electronic processors coupled to a detection array of a range detection device, data from a camera. The camera includes a field of view and the data includes at least one of an image and a video. The method further includes identifying, with the one or more electronic processors, a first area in the field of view of the camera. The method further includes determining, with the one or more electronic processors, a first threat probability of the first identified area. The method further includes determining, with the one or more electronic processors, that the first threat probability is greater than a threat level threshold. The method further includes, in response to determining that the first threat probability is greater than the threat level threshold, providing, with the one or more electronic processors, an instruction to the detection array to change a shape of a beam created by the detection array to focus the beam in a direction of the first identified area. In response to receiving the instruction, the detection array emits the beam with the changed shape to focus the beam in the direction of the first identified area.

Another embodiment provides a detection system control device including a camera configured to capture data. The camera includes a field of view, and the data includes at least one of an image and a video. The detection system control device also includes a detection array, and one or more electronic processors communicatively coupled to the camera and the detection array. The one or more electronic processors are configured to receive the data from the camera, and identify a first area in the field of view and a second area in the field of view. The one or more electronic processors are further configured to determine a first threat probability of the first identified area and a second threat probability of the second identified area. The one or more electronic processor are configured to determine that the first threat probability is greater than the second threat probability by a predetermined amount. In response to determining that the first threat probability is greater than the second threat probability by the predetermined amount, the one or more electronic processors are configured to provide an instruction to the detection array to change a shape of a beam created by the detection array to focus the beam in a first direction of the first identified area and away from a second direction of the second identified area. In response to receiving the instruction, the detection array emits the beam with the changed shape to focus the beam in the first direction of the first identified area and away from the second direction of the second identified area.

Each of the above-mentioned embodiments will be discussed in more detail below, starting with example communication system and device architectures of the system in which the embodiments may be practiced, followed by an illustration of processing steps for achieving the method and system for enabling a threat detection sensor system to monitor an area surrounding a vehicle. Further advantages and features consistent with this disclosure will be set forth herein, with reference to the figures.

Referring to FIG. 1, an example communication system diagram illustrates a system 100 including a vehicle 102 and an example wireless infrastructure radio access network (RAN) 152. The vehicle 102 is illustrated with a vehicle occupant including an officer 104 having an associated personal radio communication device 105. The vehicle 102 is equipped with a vehicular computing device 108. For example, the vehicular computing device 108 may be mounted in the vehicle 102. The vehicle 102 also includes an internal speaker 109, and an antenna 112 communicatively coupled to a transceiver at the vehicular computing device 108 for communicating with other computing devices in an ad-hoc manner or in an infrastructure manner via RAN 152, a 360-degree (360°) threat detection sensor system 120 (also referred to as integrated vehicular appliance 120) for capturing 360° field-of-view of an area surrounding the vehicle 102 to detect potential threats, external lights 122 and 124, and external speaker 126.

The vehicle 102 may be a human-operable vehicle, or may be partially or fully self-driving vehicle operable under control of the vehicular computing device 108 perhaps in cooperation with the 360-degree threat detection sensor system 120. The 360-degree threat detection sensor system 120 may include one or more visible-light camera(s), infrared light camera(s), time-of-flight depth camera(s), radio wave emission and detection (such as radio direction and distancing (RADAR) or sound navigation and ranging (SONAR) device(s)), and/or light detection and ranging (Li- DAR) devices for self-driving purposes and/or for the other purposes as set forth herein. The vehicular computing device 108 may further contain an application (e.g., a mapping and routing application) that may provide an input interface (touch, keyboard, voice, wireless transceiver, etc.) for a user such as the officer 104 to enter an intended destination or assigned incident location, or to select a particular area of interest (e.g., a doorway, a window, or the like) that needs to be monitored via the 360-degree threat detection sensor system 120 for detecting threats. In some embodiments, potential threats detected by the threat detection sensor system 120 include movement of an object (for example, a person, an animal, or the like) toward the vehicle 102, any movement of an object within a predetermined distance of the vehicle 102, recognition of a potentially dangerous object (for example, a gun, a fire, or the like) within a predetermined distance of the vehicle, and/or the like.

The officer 104 is illustrated in FIG. 1 as an officer (e.g., such as a police officer), but in other embodiments, may be any type of registered vehicle occupant, that may drive the vehicle 102 to a particular location (e.g., an incident location), or may enter an intended location. The officer 104 may be interested in receiving alert notifications (e.g., on officer's personal radio communication device 105, or via internal speaker 109) related to detected threats in one or more areas of interest surrounding the vehicle 102. The officer 104 may, in other embodiments, work for other governmental and non-governmental agencies such as park districts, real estate offices, and other types of security details. The officer 104 is also equipped with an associated personal radio communication device 105, which may be carried as a hip radio, as an integrated radio-speaker-microphone (RSM) device, or some other electronic device capable of communicating via short-range and/or long-range wireless communication links with the vehicular computing device 108, with each other, and/or with controller 156 via RAN 152, among other possibilities.

The personal radio communication device 105 may be any mobile computing device used for infrastructure RAN or direct-mode media (e.g., voice, audio, video, etc.) communication via a long-range wireless transmitter and/or transceiver that has a transmitter transmit range on the order of miles (e.g., 0.5-50 miles, or 3-20 miles and in comparison to a short-range transmitter such as a Bluetooth, Zigbee, or NFC transmitter) with other mobile computing devices and/or the infrastructure RAN 152. The long-range transmitter may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), other LMR radio protocols or standards, or the like.

In addition to or as an alternative to the long-range transmitter or transceiver, the radio communication device 105 may further contain a short-range transmitter or transceiver that has a transmitter transmit range on the order of meters (e.g., such as a Bluetooth, Zigbee, or NFC connection having a transmit range on the order of 0.01-100 meters, or 0.1-10 meters) for communicating with each other or with other computing devices such as vehicular computing device 108. The radio communication device 105 may further contain one or more physical electronic ports (such as a USB port, an Ethernet port, an audio jack, etc.) for direct electronic coupling with other computing devices such as vehicular computing device 108 or for coupling with other accessories such as a radio speaker microphone (RSM).

The radio communication device 105 may additionally include a push to talk (PTT) button that enables transmission of voice audio captured at a microphone of the radio communication device 105 to be transmitted via its short-range or long-range transceiver to other radio communication devices or to other computing devices such as dispatch console 158 via RAN 152, and enables reception of voice audio (when not depressed) received at the radio communication device 105 via its long-range or short-range receiver and played back via a speaker of the radio communication device 105. In those embodiments where the radio communication device is a full-duplex device, instead of a half-duplex device, depression of the PTT button may allow simultaneous transmission and reception of voice audio, instead of mere reception, among other communication media types such as video. The radio communication device 105 may further include a display screen for displaying images (e.g., a visual map identifying the obstructed areas surrounding the vehicle 102), video, and/or text. Such a display screen may be, for example, a liquid crystal display (LCD) screen or an organic light emitting display (OLED) display screen. In some embodiments, a touch sensitive input interface may be incorporated into the display screen as well, allowing the officer 104 to interact with content (e.g., to select a particular area of interest for monitoring via the 360-degree threat detection sensor system 120) provided on the display screen. A soft PTT input may also be provided, for example, via such a touch interface. Furthermore, a video camera may be provided at the radio communication device 105, integrating an ability to capture images and/or video and store the captured image data (for further analysis) or transmit the captured image data as an image or video stream to the vehicular computing device 108, to other radio communication devices, and/or to other computing devices via RAN 152. The radio communication device 105 may provide an alert notification when a threat is detected based on the data produced by the 360-degree threat detection sensor system 120.

Vehicular computing device 108 may be any computing device specifically adapted for operation within the vehicle 102, and may include, for example, a vehicular console computing device, a tablet computing device, a laptop computing device, or some other computing device commensurate with the rest of this disclosure and may contain many or all of the same or similar features as set forth above with respect to the radio communication device 105. In some embodiments, the vehicular computing device 108 may form a hub of communication connectivity for one or more of the associated radio communication device 105, the 360-degree threat detection sensor system 120, the external lights 122, 124, and the speakers 109, 126, each of which may be communicatively coupled to the vehicular computing device 108 via one or both of a wired communication link and a short-range wireless communication link. The vehicular computing device 108 may further include or have access to a transceiver and may be coupled to antenna 112 and through which the vehicular computing device 108 itself and the above-mentioned other devices may further communicate with or be accessed by a long-range wireless communication link with RAN 152, such as via LTE or LMR. The vehicular computing device 108 may similarly provide alert notification about detected threats.

Internal speaker 109 is an audio output-device communicatively coupled to the vehicular computing device 108 and perhaps indirectly paired to the radio communication device 105, for playing back audio such as a public safety tone, series of tones, or spoken words (e.g., to alert the officer 104 about approaching threats. In some embodiments, speaker 109 may be replaced with a plurality of speakers displaced throughout the internal cabin of the vehicle 102 and selectively enabled in accordance with a detected approaching threat of a particular area surrounding the vehicle 102 such that a particular one of the plurality of speakers closest to the approaching threat is selected to playback the tone, spoken notification, or other type of speech output to indicate a relative direction of the approaching threat.

The 360-degree threat detection sensor system 120 is a communicatively coupled set of one or more electronic ranging devices that may include one or more capture-only devices and/or one or more emit and capture devices. More specifically, the set of one or more electronic ranging devices may include one or more of visible-light capture camera(s), infrared capture camera(s), time-of-flight depth camera(s), radio wave distancing device(s), and/or light detection and ranging (LiDAR) device(s), among other possibilities. In some embodiments, the emit and capture devices include a detection array configured to emit a beam (for example, a pulsed or continuous beam of radio waves, sound waves, light, or the like) and receive a reflected beam from an object to determine a location and/or speed of the object. In some embodiments, the detection array of the one or more electronic ranging devices includes at least one of the group consisting of a radar array, a LiDAR array, and a sonar array. The 360-degree threat detection sensor system 120 is physically coupled to the vehicle 102, such as centrally positioned atop the vehicle 102 as illustrated in FIG. 1, or in other embodiments, may be distributed amongst various satellite locations around the vehicle 102 and wiredly or wirelessly coupled to a centralized processing device such as an enclosure same or similar to that illustrated in FIG. 1 as the 360-degree threat detection sensor system 120 or perhaps to the vehicular computing device 108, among other possibilities. When disposed in a distributed fashion, portions of the 360-degree threat detection sensor system 120 may be disposed in other parts of the vehicle 102, such as in the external lights 122 and 124 (which in other embodiments not illustrated may take the form of an elongated light bar positioned atop the vehicle 102), within one or more side or rear view mirrors, integrated into a rear-view camera, or other locations or devices distributed across the internal or external portions of the vehicle 102 and having a view surrounding the vehicle 102.

The 360-degree threat detection sensor system 120 is configured, by itself or in cooperation with vehicular computing device 108, to monitor an area surrounding the vehicle 102 for detecting potential threats. The 360-degree threat detection sensor system 120 may be continuously on and leveraging its electronic ranging devices to detect an approaching threat in an area surrounding the vehicle 102, may only periodically be turned on at a regular or semi-regular cadence to detect whether there are any approaching threats in an area surrounding the vehicle 102, or may be triggered to begin scanning for threats surrounding the vehicle 102 upon occurrence of some other trigger detected at the 360-degree threat detection sensor system 120 or vehicular computing device 108, or upon receipt of an instruction from, for example, the vehicular computing device 108 (for example, in response to a user input received from the officer 104 via the radio communication device 105 or the vehicular computing device 108) or the RAN 152 (for example, in response to a user input received from a dispatcher via a dispatch console 158), among other possibilities.

The one or more electronic ranging devices may comprise a single scanning device having a field-of-view of less than 360° and that is then caused to rotate and scan at a particular frequency, such as rotating 1-10 times per second to create a 360° field-of-view of the area surrounding the 360-degree threat detection sensor system 120 and thus the vehicle 102 to which it is attached. In other embodiments, a plurality of range detection devices, each having a field-of-view less than 360°, may be statically placed around the 360-degree threat detection sensor system 120 or in a distributed manner around the vehicle 102 as set forth earlier, to altogether enable a 360° field-of-view of the area surrounding the 360-degree threat detection sensor system 120 and thus the vehicle 102 to which it is attached. In some embodiments, the plurality of range detection devices may also be configured to move to enable their field of view to be adjusted. For example, the range detection devices may include one or more motors configured to operate in response to instructions (for example, from the vehicular computing device 108) to move the range detection device upward, downward, to the right, or to the left. In some embodiments, the electronic ranging devices of the 360-degree threat detection sensor system 120 include one or more cameras that have a field of view that is similar to the coverage area of the one or more range detection devices (for example, cameras and range detection devices may be grouped together in pairs). In some embodiments, image data captured by a camera with a first field of view is used by the vehicular computing device 108 to control a range detection device with a first coverage area corresponding to the first field of view as explained in greater detail below. In some embodiments, the vehicular computing device 108 controls different range detection devices on the vehicle 102 differently based on the range detection devices facing different direction and based on their corresponding cameras providing different fields of view.

In still other embodiments, and for both visible or infrared light imaging systems and radio-wave imaging systems, complex optics and/or waveguides may be used to enable capture of a 360° field-of-view of a single static light imaging or radio wave detection sensor, for example, after which image processing or radiometry processing algorithms may be used to de-warp or otherwise compensate for distortions introduced into the captured data by the optics and/or waveguides, as necessary. As just one example, and as illustrated in FIG. 1, the 360-degree threat detection sensor system 120 may include one or more static visible light imaging devices 120A-C each having an approximate 90° field-of-view (and further including a fourth imaging device facing backwards and not illustrated in FIG. 1) that may be combined optically or digitally at the 360-degree threat detection sensor system 120 or the vehicular computing device 108 to provide visible-light imaging functionality across a 360° field-of-view, and may further include an active scanning RADAR emitter and detector 120D positioned above the visible light imaging devices 120A-C to provide both light-imaging and radio wave reflection range detection capabilities. Other arrangements and combinations are possible as well.

In accordance with some embodiments, data produced by the electronic ranging devices may then be used at the 360-degree threat detection sensor system 120 and/or the vehicular computing device 108 to detect one or more objects (e.g., physical features such as building structures, persons, vehicles, trees, and the like). Similarly, the data can also be used to monitor an area of interest surrounding the vehicle 102 for detecting an object approaching the vehicle 102 and for further classifying the object as a threat based on the characteristics of the detected object. For instance, the data produced by electronic ranging devices can be used to determine a range (relative to the vehicle 102) of one or more objects approaching the vehicle 102, perhaps in addition to other characteristics of the approaching object including but not limited to, a cross-sectional shape, an initial position, a current position, a velocity, an acceleration, a bearing, and/or a size (length, width, and/or height) of the object. The 360-degree threat detection sensor system 120 and/or the vehicular computing device 108 may also then use the characteristics to predict a future location, path, trajectory, or status of the object. Such characteristics may additionally or alternatively be used to classify the object as a person (including type of person such as adult or child), vehicle 102 (including type of vehicle 102 such as car, motorcycle, or airborne drone), animal (including type of animal such as cat or dog), or other type of object. Such characteristics, predictions, and classifications may be stored in a memory at the 360-degree threat detection sensor system 120 and/or the vehicular computing device 108 accompanying or separate from an image, point cloud, or echo map illustrative of the object or objects detected by the electronic ranging devices. The characteristics, predictions, and classifications and/or the image, point cloud, or echo maps may be stored at the 360-degree threat detection sensor system 120 and/or the vehicular computing device 108, and/or may be transmitted to a separate storage or processing device (such as controller 156, dispatch console 158, or cloud computing cluster 160) via infrastructure RAN 152, among other possibilities.

Each of the electronic ranging devices may have an associated ranging function associated with it for determining an approximate range of a detected object or threat from the 360-degree threat detection sensor system 120 and thus the vehicle 102. For example, for visible light or infrared light imaging devices incorporated into the 360-degree threat detection sensor system 120, pre-configured portions of the captured image frames may be associated with particular distances. For example, a lower quarter of the frame, perhaps identified via pixel count, may be associated with a distance of 5-10 m (or 7 m) from the vehicle 102, while a second quarter of the frame may be associated with a distance of 10-20 m (or 15 m) from the vehicle 102, and a remainder of the frame associated with indeterminate distances or above-horizon distances. Such mappings between frame portions and distances may be varied based on parameters such as pan, tilt, zoom settings (if any) of the imaging cameras, a detected orientation of the vehicle 102 and/or the 360-degree threat detection sensor system 120 beyond level, or other detected variations. In still other embodiments, direct mappings may not be used, but instead, analytics applied to capture images that use known or learned sizes of known or learned objects detected in the frame to calculate relative distances from the vehicle 102 or the 360-degree threat detection sensor system 120 to detected objects. For example, other vehicles or other people captured in the frame may be compared to known or average sizes of such objects to then infer a distance in the image to a particular detected object. Other methods of determining a distance to an object in a captured image could be used as well. On the other hand, for emission and detection systems such as LiDAR and RADAR, time of flight information measured from the time of emission to the time of detection, and knowledge/pre-configuration of the speed of such emissions through air, may be used to directly calculate an estimated distance from the vehicle 102 or the 360-degree threat detection sensor system 120 to detected objects.

External lights 122, 124 may be any type of externally-perceivable visible lights and may include an underlying LED, incandescent, and/or halogen lamp whose light output is constant and unidirectional or which may be modulated into a strobe, directional rotating, blinking, or otherwise non-static and/or focused output, and may comprise a white or colored (e.g., red, blue, etc.) light. While external lights 122, 124 are depicted in FIG. 1 as separately placed individual lights, in other embodiments, light bars that span substantially the entire width of the roof of the vehicle 102 with a number of same or different sized and/or colored lights in various matrix arrays may be included as well.

External speaker 126 is a speaker, such as a horn or siren, including an amplifier that broadcasts an externally-perceivable audio output such as a public safety tone, series of tones, or spoken words that may be perceived by other officers, civilians, or suspects nearby while outside of the vehicle 102. In some embodiments, and similar to the internal speaker 109, the external speaker 126 may be replaced with a plurality of speakers displaced throughout the external body of the vehicle 102 and selectively enabled in accordance with a detected approaching threat surrounding the vehicle 102 such that a particular one of the plurality of speakers closest to the detected approaching threat is selected to playback a tone, spoken notification, or other type of speech output to indicate a relative direction of the approaching threat. In still other embodiments, a physical pan, tilt mechanism may be used to effect directionality of sound emitting from directional external speaker 126, while in other embodiments, a plurality of speakers in a matrix configuration may be used to beam steer audio output from the external speaker 126 to a particular location commensurate with the location of the approaching threat or the location of the officer 104. Other possibilities exist as well.

Infrastructure RAN 152 may implement, over wireless link(s) 140, a narrowband wireless system such as a conventional or trunked LMR standard or protocol, which may include an ETSI DMR, a P25 standard defined by the APCO, TETRA, or other LMR radio protocols or standards. In other embodiments, infrastructure RAN 152 may additionally or alternatively implement over wireless link(s) 140 a broadband wireless system such as an LTE protocol including MBMS, an OMA-PoC standard, a VoIP standard, or a PoIP standard. In still further embodiments, infrastructure RAN 152 may additionally or alternatively implement over wireless link(s) 140 a Wi-Fi protocol perhaps in accordance with an IEEE 802.11 standard (e.g., 802.11a, 802.11b, 802.11g) or a WiMAX protocol perhaps operating in accordance with an IEEE 802.16 standard. Other types of wireless protocols could be implemented as well.

The infrastructure RAN 152 is illustrated in FIG. 1 as providing communication coverage for the vehicle 102 and its occupants via a single fixed terminal 154 coupled to a controller 156 (e.g., radio controller, call controller, PTT server, zone controller, MME, BSC, MSC, site controller, Push-to-Talk controller, or other network device) and including a dispatch console 158 operated by a dispatcher. In other embodiments, more or different types of fixed terminals may provide RAN services to the vehicle 102 and vehicle occupants and may or may not contain a separate controller 156 and/or dispatch console 158.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

The controller 156 illustrated in FIG. 1, or some other backend electronic computing device existing on-premises or in the remote cloud computing cluster 160 accessible via an IP network (such as the Internet), may additionally or alternatively operate as a back-end electronic digital assistant, a back-end audio and/or video processing electronic computing device, and/or a remote cloud-based storage device consistent with the remainder of this disclosure.

Figure 2:
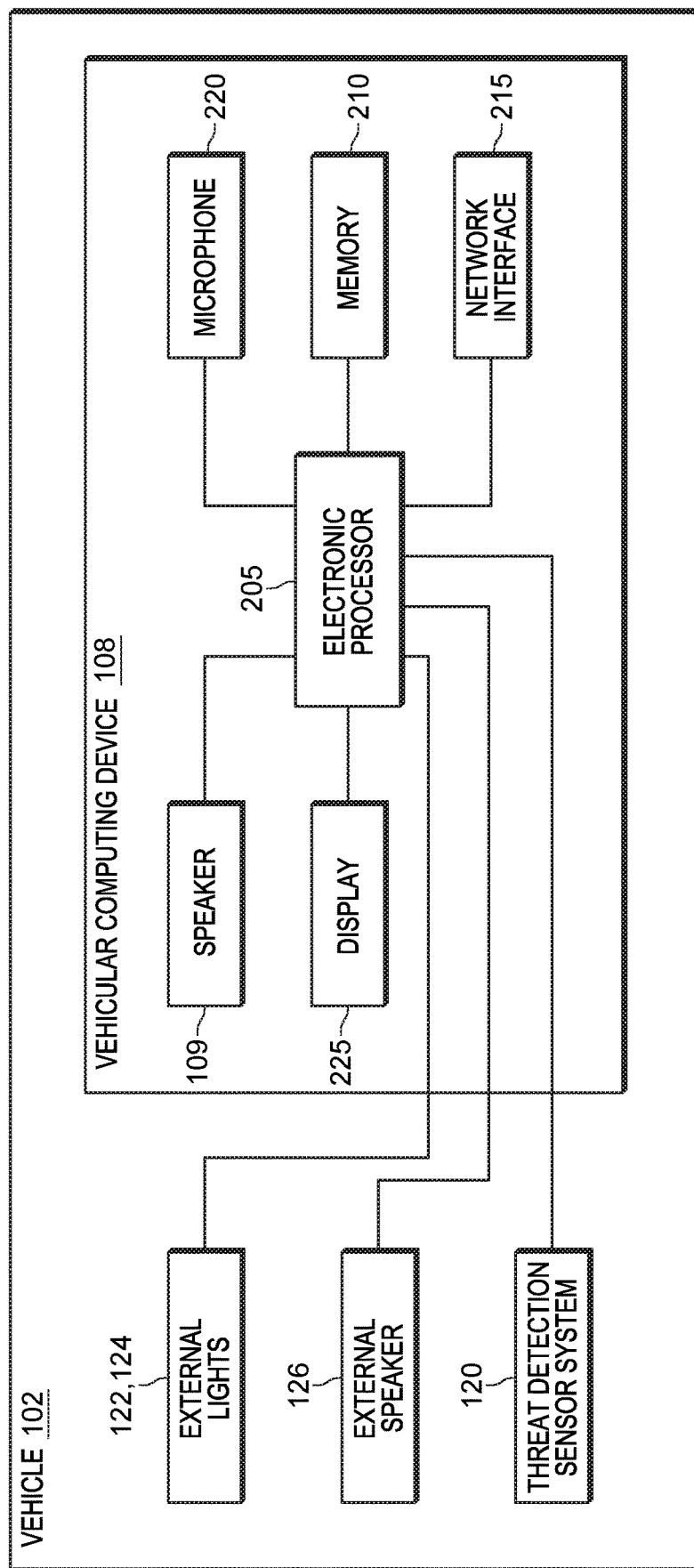
FIG. 2 is a block diagram of the vehicle of FIG. 1 and includes devices included in or on the vehicle of FIG. 1 in accordance with some embodiments.

FIG. 2 is a block diagram of devices included in or on the vehicle 102 according to one embodiment. In some embodiments, one or more devices of the vehicle 102 may be referred to as an integrated vehicle assistant (IVA). In the embodiment illustrated, the vehicle 102 includes the vehicular computing device 108 described previously herein. As shown in FIG. 2, in some embodiments, the vehicular computing device 108 includes an electronic processor 205 (for example, a microprocessor or other electronic device). The electronic processor 205 includes input and output interfaces (not shown) and is electrically coupled to a memory 210, a network interface 215, a microphone 220, the speaker 109, and a display 225. In some embodiments, the electronic processor 205 is communicatively coupled (for example, wirelessly and/or via wired connections) to other devices of the vehicle 102 including the threat detection sensor system 120, the external lights 122, 124, and the external speaker 126 as shown in FIG. 2. In some embodiments, the vehicle 102 and/or the vehicular computing device 108 include fewer or additional components in configurations different from that illustrated in FIG. 2. For example, the vehicular computing device 108 includes a push-to-talk button or a global positioning system (GPS) receiver or a similar component that may determine the geographic coordinates of the location of the vehicle 102. As another example, the vehicle 102 may include additional microphones external to the vehicular computing device 108 that are configured to be communicatively coupled to the electronic processor 205. In some embodiments, the vehicular computing device 108 performs functionality other than the functionality described below.

The memory 210 may include read only memory (ROM), random access memory (RAM), other non-transitory computer-readable media, or a combination thereof. The electronic processor 205 is configured to receive instructions and data from the memory 210 and execute, among other things, the instructions. In particular, the electronic processor 205 executes instructions stored in the memory 210 to perform the methods described herein.

The network interface 215 sends and receives data to and from the other devices within the system 100 (for example, via long-range communication links and the infrastructure RAN 152 and/or directly to other devices via short-range communication links). For example, the network interface 215 may include a transceiver for wirelessly communicating with the infrastructure RAN 152. Alternatively or in addition, the network interface 215 may include a connector or port for receiving a wired connection to the infrastructure RAN 152, such as an Ethernet cable. In some embodiments, the transceiver may be configured to perform short-range communication as well. In other embodiments, the network interface 215 includes a separate transceiver configured to perform short-range communication. In some embodiments, the network interface 215 includes one or more antennas (for example, the antenna 112) coupled to the one or more transceivers. The electronic processor 205 may communicate data to and from other devices in the system 100 via the network interface 215 (for example, voice data, data captured by the threat detection sensor system 120 such as image/video captured by a camera, or the like). The electronic processor 205 receives electrical signals representing sound from the microphone 220 and may communicate information relating to the electrical signals via the network interface 215 to other devices, for example, to the radio communication device 105 or another communication device. Similarly, the electronic processor 205 may output data received from other devices via the network interface 215, for example from the dispatch console 158, through the speaker 109, the display 225, the external speaker 126, or a combination thereof.

The display 225 displays images, video, and/or text to the officer 104. The display 225 may be a liquid crystal display (LCD) screen or an organic light emitting display (OLED) display screen. In some embodiments, a touch sensitive input interface may be incorporated into the display 225 as well, allowing the user to interact with content provided on the display 225. In some embodiments, the electronic processor 205 displays a live or stored image of a field of view of a camera of the threat detection sensor system 120 on the display 225 to allow the officer 104 to view a field of view of the camera. In some embodiments, the display 225 is configured to receive a user input from the officer 104 that indicates an area of interest included in the field of view. For example, the display 225 may receive a user input that circles or otherwise outlines an area of interest included in the field of view (for example, a doorway, a window, or the like).

In some embodiments, the radio communication device 105, the threat detection sensor system 120, the controller 156, the dispatch console 158, and one or more computing devices that comprise the cloud computing cluster 160 include similar components that perform similar functionality as those shown in FIG. 2 with respect to the vehicular computing device 108. For example, the controller 156 includes an electronic processor, a memory, and a network interface similar to the like-named components described above with respect to the vehicular computing device 108 but may not include the other components shown in FIG. 2. As another example, the radio communication device 105 may include all of the components described above with respect to the vehicular computing device 108 of FIG. 2. As another example, the threat detection sensor system 120 may include an electronic processor, a memory, one or more microphones, and one or more of the range detection devices described previously herein such as cameras, radar devices, sonar devices, LiDAR devices, and/or the like. In some embodiments, the threat detection sensor system 120 includes its own network interface to communicate with other devices of the system 100. In other embodiments, the threat detection sensor system 120 communicates with other devices of the system 100 via the network interface 215 of the vehicular computing device 108. In some embodiments, the electronic processor 205 of the vehicular computing device 108 also acts as the electronic processor for the threat detection sensor system 120 to control the components of threat detection sensor system 120.

As explained above, vehicle-based sensor systems may be enabled to monitor an area surrounding the vehicle 102 and alert the officer 104 about potential threats. However, the likelihood of a threat originating from different areas surrounding the vehicle 102 may not be the same and therefore some areas surrounding the vehicle 102 may be of higher interest for monitoring and detecting threats than other areas.

In other words, some areas within the coverage area of a beam from a range detection device may have a higher likelihood that a threat will emerge from the area than other areas within the coverage area of the beam. For example, it may be more likely that a threat will emerge from over the top of a fence rather than from through the fence (e.g., see FIG. 9A). However, existing range detection devices used on vehicles emit a beam in a general direction where the range detection device is facing such that all/most areas within the coverage area of the range detection device receive approximately the same amount of range detection beam coverage (e.g., see FIGS. 4B, 6B, and 8C). In other words, low threat probability areas receive the same or a similar amount of range detection beam coverage as high threat probability areas. Thus, there is a technological problem with respect to how range detection devices used on vehicles with changing monitored areas output range detection beams to monitor for potential threats around the vehicle.

Figure 3:
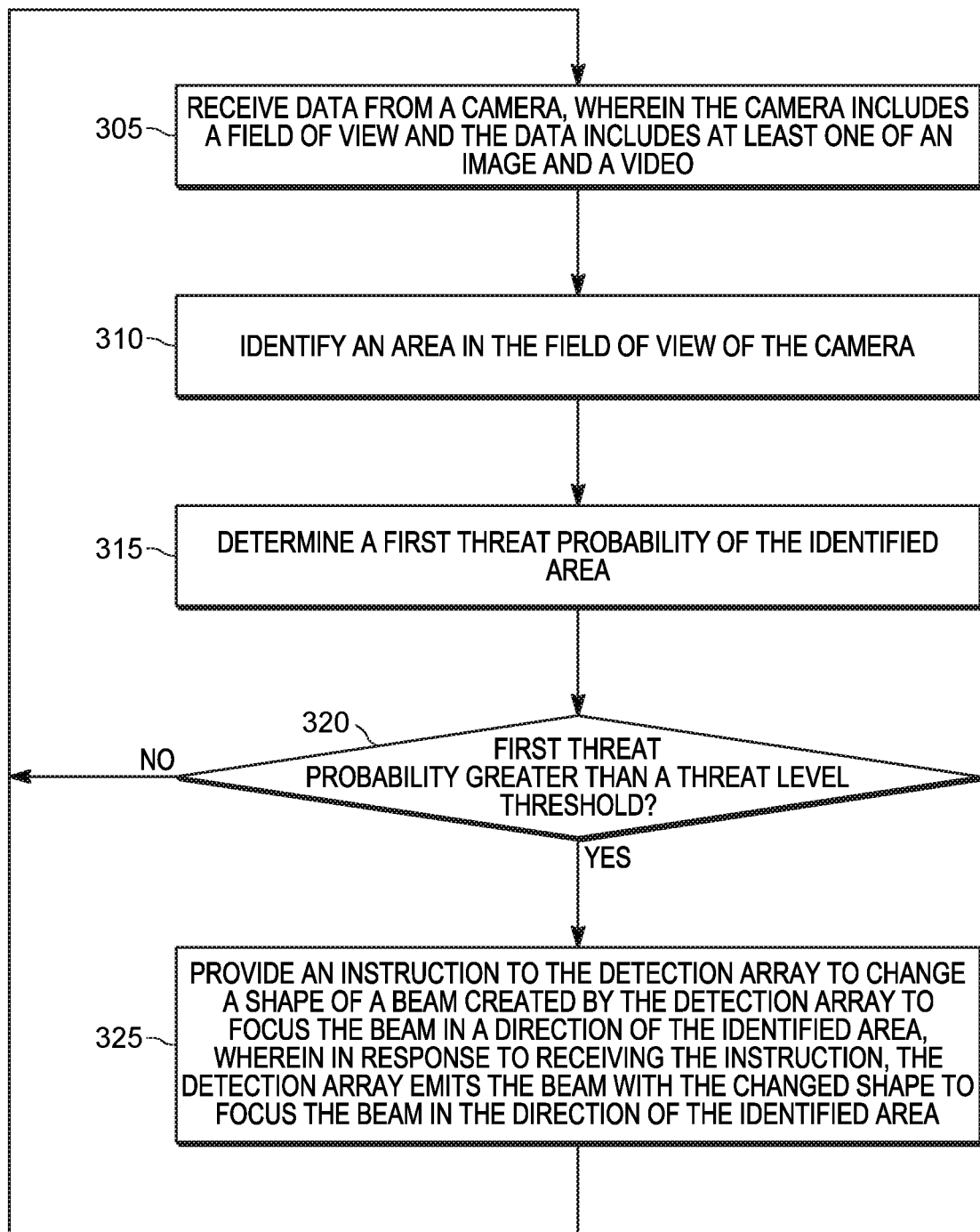
FIG. 3 is a flowchart of a method performed by one or more devices of the vehicle of FIG. 1 for providing intelligent range detection beam forming in accordance with some embodiments.

To address the above-noted technological problem, one or more electronic processors of the system 100 (in other words, a detection system control device) perform, in one instance, a method 300 illustrated in FIG. 3. The method 300 may be executed by the vehicular computing device 108 to provide intelligent range detection beam forming for a range detection device of the vehicle 102. In some embodiments, the method 300 addresses the above-noted technological problem by extending a measurable range of a range detection device of the threat detection sensor system 120 in a direction of a high threat probability area and/or reducing the measurable range of the range detection device in a second direction different from the direction of the high threat probability area. Accordingly, the threat detection sensor system 120 may be able to detect potential threats more quickly (e.g., due to extending the measurable range of the range detection device) and/or may be able to more accurately detect potential threats (e.g., by reducing false positives of detected objects in crowded areas or areas less likely to produce threats). Additional technological improvements are explained below with respect to the example use cases of FIGS. 4A through 9C.

In some embodiments, the devices of the system 100 that are involved in the performance of the method 300 are referred to as a detection system control device. In some embodiments, the one or more electronic processors that perform the method 300 are located within an individual component and/or a combination of individual components of the system 100. In some embodiments, the method 300 is performed by a single electronic processor (for example, the electronic processor 205 of the vehicular computing device 108 as described below). However, in other embodiments, the method 300 is performed by multiple electronic processors distributed in different devices of the system 100. For example, the method 300 is implemented on a combination of at least two of the electronic processors in the group consisting of the electronic processor 205 of the vehicular computing device 108, the electronic processor of the threat detection sensor system 120, the electronic processor of the controller 156, and the electronic processor of a back-end device in the cloud computing cluster 160.

FIG. 3 illustrates a flow chart diagram of the method 300 performed by one or more electronic processors of devices of the system 100 for providing intelligent range detection beam forming. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure.

At block 305, the electronic processor 205 of the vehicular computing device 108 receives data from a camera (for example, a camera included in the threat detection sensor system 120). The camera includes a field of view, and the data received from the camera includes at least one of an image and a video. As an example, the vehicle 102 may be parked at an incident location, and the camera captures an image or video of a field of view in the direction which the camera is facing (for example, see FIGS. 4A, 6A, 8A and 8B).

At block 310, the electronic processor 205 identifies an area in the field of view of the camera that is included in the image or the video. For example, the identified area is a point of interest in the image or the video such as a doorway, a window, another type of opening from which a threat may emerge, an obstruction from which a threat is not likely to emerge (for example, a wall, a fence, or the like), a heavily trafficked area with many people or other moving objects, or the like (for example, see FIGS. 5A, 7A, 9A, and 9B). In some embodiments, the electronic processor 205 identifies the area in the field of view by performing image analysis of the image or video data received from the camera. For example, performing image analysis allows the electronic processor 205 to identify types of areas included in the image or video (doorways, windows, and the like as listed in the above example). In other embodiments or situations, the electronic processor 205 identifies the area in the field of view by receiving a user input identifying the area. For example, the electronic processor 205 may display the image or video received from the camera on a display (for example, the display 225 of the vehicular computing device 108, the display of the radio communication device 105, or the like). The electronic processor 205 may receive a user input, via the display, that identifies one or more areas within the image or video. For example, the user may trace an outline around a doorway to identify the doorway as a point of interest.

Figure 7A:
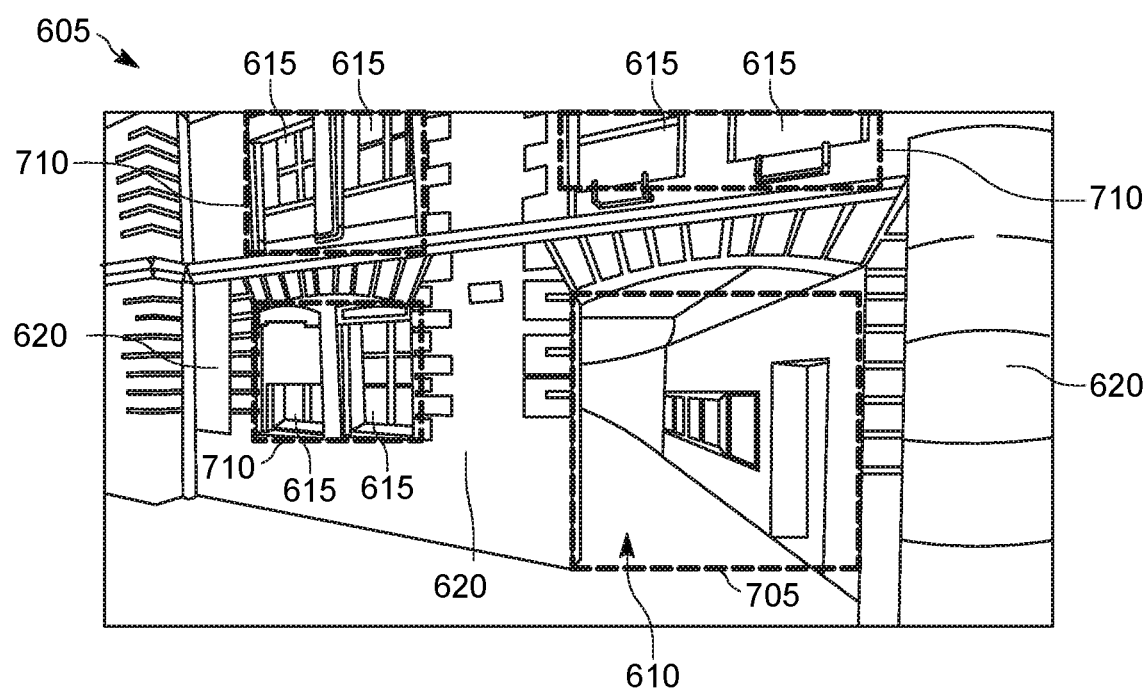
FIG. 7A illustrates multiple areas within the field of view of FIG. 6A that are identified by the electronic processor of the vehicle of FIG. 1 during performance of the method of FIG. 3 in accordance with some embodiments.
Figure 9A:
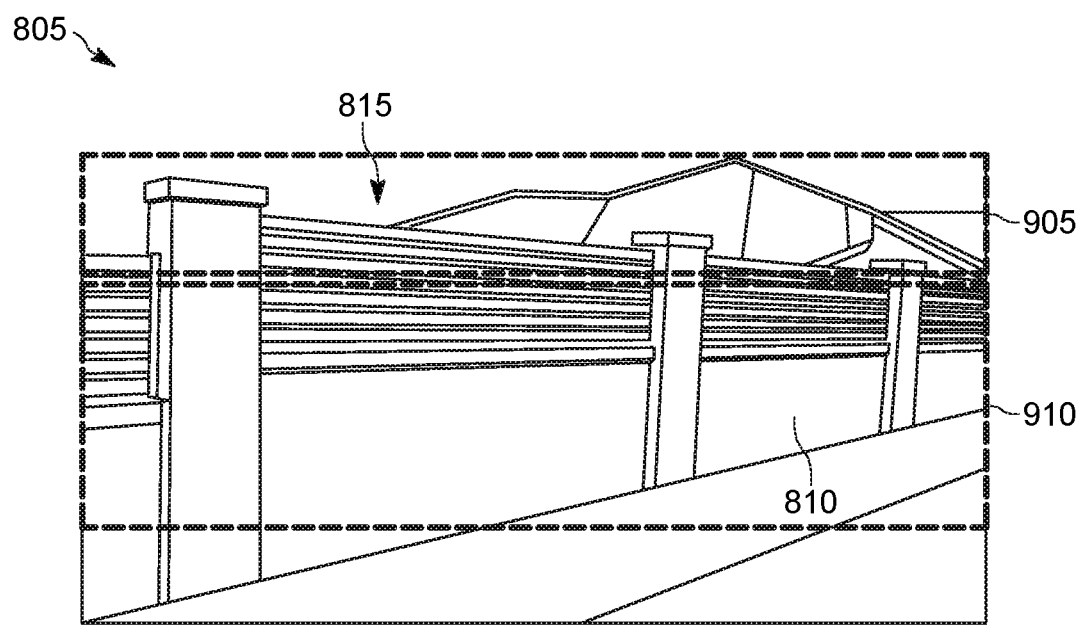
FIG. 9A illustrates multiple areas within the field of view of FIG. 8A that are identified by the electronic processor of the vehicle of FIG. 1 during performance of the method of FIG. 3 in accordance with some embodiments.
Figure 9B:
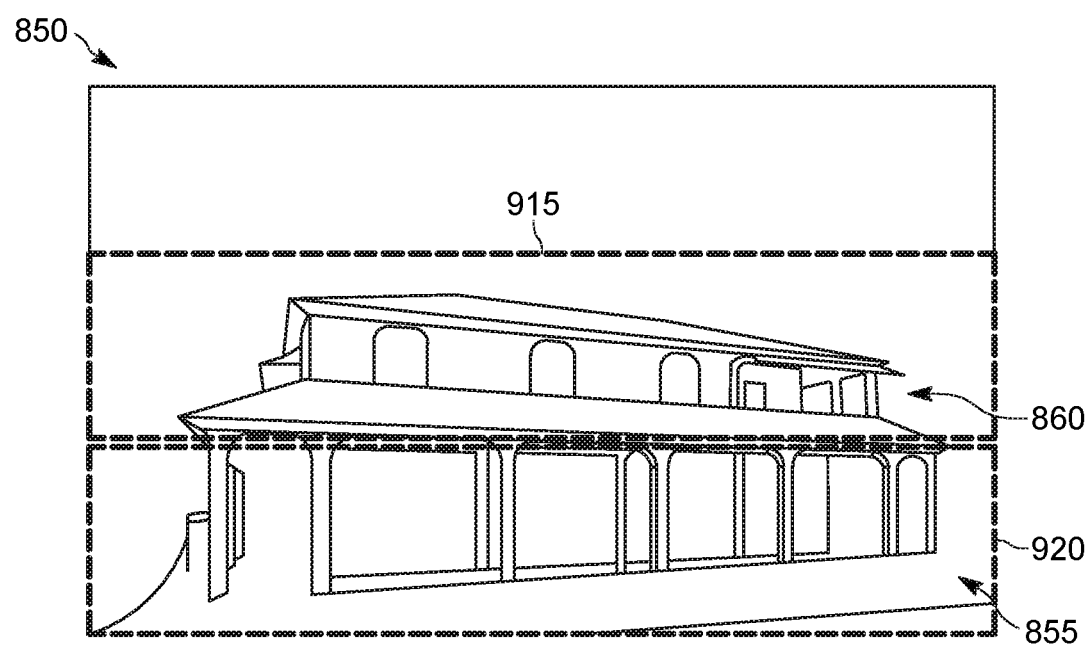
FIG. 9B illustrates multiple areas within the field of view of FIG. 8B that are identified by the electronic processor of the vehicle of FIG. 1 during performance of the method of FIG. 3 in accordance with some embodiments.

In some embodiments, the electronic processor 205 identifies multiple areas within the image or video (for example, see FIGS. 7A, 9A, and 9B). In some embodiments, in response to identifying one or more areas within the image or video at block 310, the electronic processor 205 generates metadata indicating information about the one or more identified areas including a type of area (as indicated by above examples), a distance between the identified area and the camera/vehicle 102, objects within the identified area, and the like. For example, the electronic processor 205 uses image analytics to identify objects such as a person, a gun, or the like in an identified area such as a window. The electronic processor 205 may determine the distance between the identified area and the camera/vehicle 102 using image analytics and/or a range detection device of the threat detection sensor system 120.

Although the above explanation indicates that the electronic processor 205 of the vehicular computing device 108 performs blocks 305 and 310 to identify the area in the field of view, in some embodiments, another electronic processor (for example, another electronic processor of the vehicular computing device 108 or an electronic processor of the threat detection sensor system 120) performs blocks 305 and 310. For example, the electronic processor of the threat detection sensor system 120 receives the data from the camera and performs image analysis, distance calculations, and the like to identify one or more areas in the field of view of the camera. The electronic processor of the threat detection sensor system 120 may also generate the metadata about the identified area as described above based on the image analysis. The electronic processor of the threat detection sensor system 120 may also transmit the metadata to the electronic processor 205 of the vehicular computing device 108. The electronic processor 205 may be configured to receive the metadata from the electronic processor of the threat detection sensor system 120 and continue to execute the method 300 using the metadata as described below.

At block 315, the electronic processor 205 determines a first threat probability of the identified area. In some embodiments, the electronic processor 205 determines the first threat probability based on the metadata corresponding to the identified area as generated by the electronic processor 205 or another electronic processor. In some embodiments, the electronic processor 205 determines the first threat probability based on at least one of an area type of the identified area, a distance between the camera/vehicle 102 and the identified area, an object located in the identified area, and an incident type of an incident during which the vehicular computing device 108 is being used. For example, the memory 210 of the vehicular computing device 108 may store a look-up table of threat probability scores for different characteristics of identified areas. For example, the electronic processor 205 may establish an initial threat probability score when the type of the identified area is a doorway, hallway, alley, or other egress point as fifty points based on the stored score in the look-up table. On the other hand, the electronic processor 205 may establish an initial threat probability score when the type of the identified area is an obstacle, such as a fence or wall, as five points because a threat is significantly less likely to emerge from an obstacle than from an egress point. As another example, the electronic processor 205 may establish an initial threat probability score when the type of the identified area is a window as thirty-five points because a threat is less likely to emerge from the window than from an egress point but more likely to emerge from the window than from an obstacle.

In some embodiments, after the electronic processor 205 establishes an initial threat probability score for the identified area based on the type of the identified area using the look-up table, the electronic processor 205 modifies the initial threat probability score based on other characteristics of the identified area to determine the first threat probability. For example, the electronic processor 205 adds twenty points to the initial threat probability score when the identified area is an egress point or a window and is within twenty feet of the camera/vehicle 102. As another example, the electronic processor 205 may add ten points to the initial threat probability score when the identified area is an egress point or a window and is within forty feet of the camera/vehicle 102. As another example, the electronic processor 205 may not add points to the initial threat probability based on the distance between the identified area and the camera/vehicle 102 when the identified area is an obstacle or when the identified area is further than a predetermined distance from the camera/vehicle 102 (for example, further than forty feet from the camera/vehicle 102).

As another example of modifying the initial threat probability score, the electronic processor 205 adds thirty points to the initial threat probability score when the identified area includes a person and adds fifty points to the initial threat probability score when the identified area includes a gun. For example, the electronic processor 205 may use image analytic techniques to recognize objects in the captured image or video to determine that a person or a person with a gun is located in the identified area such as a doorway or window.

The initial threat probability scores and the adjustments to the initial threat probability scores in the above examples are merely examples and other values may be used. In some embodiments, these values are configurable such that different public safety agencies may input different values into the look-up table in the memory 210 for different characteristics of identified areas. In some embodiments, a maximum threat probability is one hundred. In other embodiments, there is not a maximum threat probability, and the electronic processor 205 may continue to increase the threat probability score above one hundred based on at least the above-noted characteristics of the identified area.

In some embodiments, other rules and/or other characteristics of the identified area besides those described above may be determined and used by the electronic processor 205 to determine the first threat probability of the identified area. For example, the electronic processor 205 determines that an identified heavily trafficked area with many people or other moving objects has a lower threat probability than a less trafficked area that includes an egress point (see FIGS. 8B and 9B and corresponding explanation below). As another example, the initial threat probability scores and the adjustments to the initial threat probability scores may be different depending on an incident type of an incident during which the vehicular computing device 108 is being used. For example, the memory 210 may store multiple look-up tables with different values as each other for the same characteristics of the identified area. The electronic processor 205 may determine which look-up table to use to determine the first threat probability of the identified area based on the incident type of the incident. For example, when the incident is a traffic stop by a police officer (for example, for a vehicle exceeding the speed limit), the initial threat probability score for identified areas that include nearby windows may be lower (for example, twenty-five points) than when the incident is a burglary or a hostage situation (for example, thirty-five points) during which a threat may be more likely to emerge from a window than during a traffic stop. In some embodiments, the electronic processor 205 may use different look-up tables to determine the first threat probability based on a severity level of the incident (as illustrated by the above example) or based on a location of the incident. In some embodiments, the electronic processor 205 determines the incident type and/or severity level of the incident by performing voice analytics on voice communications of the officer 104 (for example, when the officer 104 calls a dispatcher to report an incident). In some embodiments, the electronic processor 205 determines the location of the incident based on a current location of the vehicle 102 as determined by a global positioning system received included in the vehicle 102.

In some embodiments, the electronic processor 205 determines the first threat probability by using historical data from previous captured images/videos and situations. For example, the electronic processor 205 may include a neural network that receives training images/videos from previous incidents where areas were previously identified as having, for example, a low threat probability, a medium threat probability, or a high threat probability. Based on the training images/videos, the electronic processor 205 may learn to identify the first threat probability of a newly-identified area when the newly-identified area has similar characteristics as previous areas included in the training images/videos. Similarly, in some embodiments, the neural network of the electronic processor 205 may learn how to identify the area in the field of the camera (at block 310) and the type of identified area by receiving training images/videos from previous incidents with types of areas previously identified.

At block 320, the electronic processor 205 determines whether the first threat probability of the identified area is greater than a threat level threshold. In some embodiments, the threat level threshold is a predetermined value such as sixty points that may be stored in the memory 210. In some embodiments, the predetermined value of the threat level threshold is configurable such that different public safety agencies may input different values into the memory 210. In some embodiments, the memory 210 stores numerous threat level thresholds that are different. The electronic processor 205 may determine to use one of the stored values for the threat level threshold depending on, for example, an incident type of the incident during which the vehicular computing device 108 is being used, a severity level of the incident, and/or a location of the incident (similar to the different stored look-up tables explained above).

When the electronic processor 205 determines that the first threat probability is not greater than the threat level threshold (at block 320), the method 300 proceeds back to block 305 to allow the electronic processor 205 to continue monitoring image and/or video data received from the camera. By repeating blocks 305 through 320 of the method 300, the electronic processor 205 dynamically evaluates the threat probabilities of areas as the field of view of the camera changes and as the objects within the field of the camera move or change position.

On the other hand, when the electronic processor 205 determines that the first threat probability is greater than the threat level threshold (at block 320), the method 300 proceeds to block 325.

In some embodiments, the electronic processor 205 is configured to determine that the first threat probability is greater than the threat level threshold (at block 320) by comparing threat probabilities of two different identified areas in the field of view of the camera (for example, see FIGS. 7A, 9A, and 9B). For example, the electronic processor 205 identifies a second area in the field of view and determines a second threat probability of the second identified area. The electronic processor 205 may then compare the second threat probability of the second identified area to the first threat probability of the first identified area to determine whether the first threat probability is greater than the second threat probability by a predetermined amount (for example, twenty points, thirty points, or the like). In some embodiments, the predetermined amount is configured to indicate a significant discrepancy between a threat probability of the two identified areas. In other words, when the threat probabilities of two different areas are only two points apart, it may not be worth distinguishing between the two areas because both areas have a similar threat probability. In some embodiments, the predetermined amount is configurable such that different public safety agencies may input different values into the memory 210 to indicate how much of a discrepancy in threat probability between the identified areas is needed before the electronic processor 205 determines that one of the threat probabilities exceeds the threat level threshold (at block 320). In response to the electronic processor 205 determining that the first threat probability is greater than the second threat probability by the predetermined amount (at block 320), the method 300 proceeds to block 325.

In response to determining that the first threat probability is greater than the threat level threshold, at block 325, the electronic processor 205 provides an instruction to the detection array of the range detection device associated with the camera to change a shape of a beam created by the detection array to focus the beam in a direction of the identified area. The range detection device receives the instruction and, in response to receiving the instruction, the detection array emits the beam with the changed shape to focus the beam in the direction of the identified area. In some embodiments, the detection array of the range detection device includes a plurality of antennas each configured to output a wave to create the beam. In some embodiments, the detection array is configured to emit the beam with the changed shape to focus the beam in the direction of the identified area by mechanically moving at least one antenna of the plurality of antennas toward the direction of the identified area. For example, the range detection device may include a motor configured to mechanically change a direction in which the detection array is facing (for example, up, down, left, and right). In some embodiments, the detection array is configured to emit the beam with the changed shape to focus the beam in the direction of the identified area by electronically controlling a phase of the wave emitted by at least one antenna of the plurality of antennas. In some embodiments, the detection array is configured to emit the beam with the changed shape to focus the beam in the direction of the identified area by electronically adjusting an intensity/power of the wave emitted by at least one antenna of the plurality of antennas. The detection array may be configured to emit the beam with the changed shape to focus the beam in the direction of the identified area and/or away from a direction of a low threat probability area in other manners as well. As indicated by the examples discussed herein, the detection array is configured to emit the beam with the changed shape to perform one or more of horizontal axis beam forming (see FIGS. 9A through 9C), vertical axis beam forming (see FIGS. 5A and 5B), beam forming to focus the beam toward an area such as a window, opening, or other object (see FIGS. 7A and 7B), and the like.

As illustrated in FIG. 3, after the electronic processor 205 executes block 325, the method 300 proceeds back to block 305 to repeat the method 300. By repeating the method 300, the electronic processor 205 dynamically evaluates the threat probabilities of areas as the field of view of the camera changes and as objects within the field of the camera appear, move, or change position.

The vehicular computing device 108 executes the method 300 to improve monitoring of possible threats around the vehicle 102. When a possible threat is detected by the electronic processor 205, the electronic processor 205 may provide an alert to the officer 104, for example, via the display 225, the speaker 109, the external speaker 126, the lights 122, 124, a display and/or speaker of the radio communication device 105, or a combination thereof. For example, when the electronic processor 205 determines that an object (for example, a person or animal) is moving toward the vehicle 102, the electronic processor 205 may provide an alert to the officer 104.

FIGS. 4A through 9C illustrate example use cases of the vehicular computing device 108 executing the method 300 to perform threat detection monitoring compared to using existing threat detection monitoring. These example use cases illustrate technological advantages of the present disclosure over existing systems as described below.

Figure 4A:
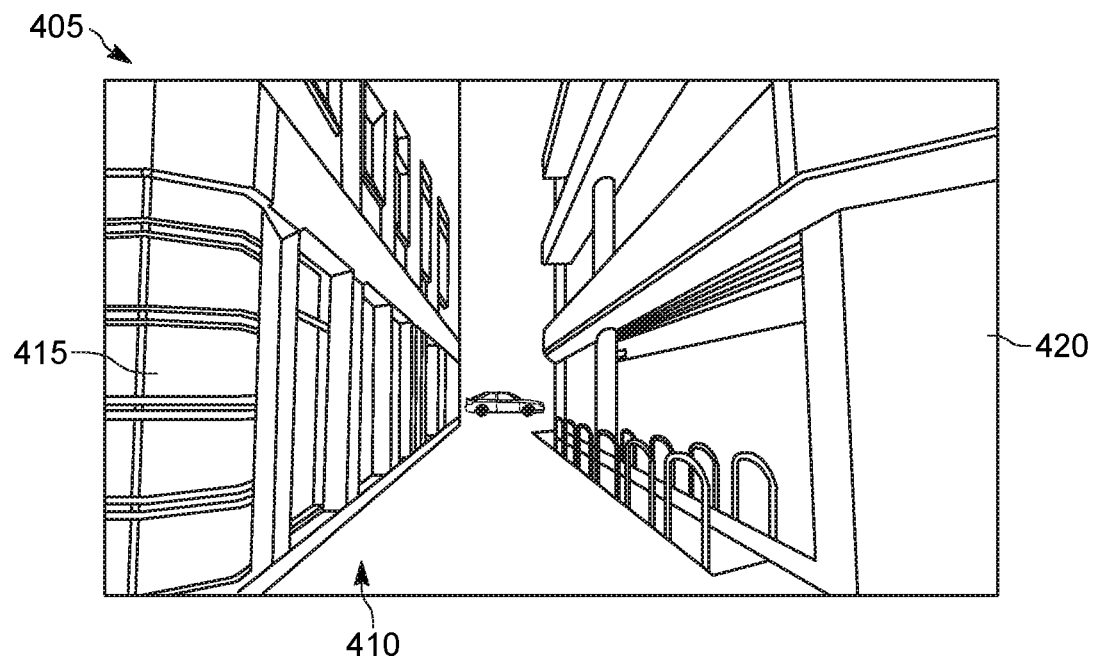
FIG. 4A illustrates a field of view of a camera of the vehicle of FIG. 1 in one example situation.
Figure 4B:
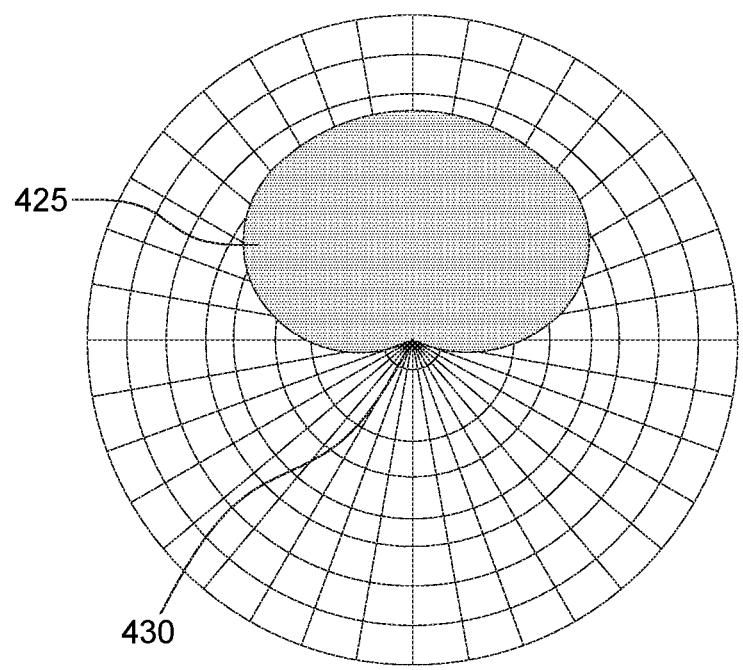
FIG. 4B illustrates a wide band beam pattern emitted from a detection array of a range detection device of the vehicle of FIG. 1 in accordance with some embodiments.

FIG. 4A illustrates a field of view 405 of a camera of the threat detection sensor system 120 according to one example situation. The field of view 405 includes an alleyway 410, a first obstruction 415 (a wall of a first building), and a second obstruction 420 (a wall of a second building). In existing threat detection sensor systems, a range detection device may emit a wide band beam pattern 425 from a location 430 of the range detection device as shown in FIG. 4B. This wide band beam pattern 425 may be emitted by existing systems regardless of the field of view of the camera, a location of the vehicle 102, and/or an incident type of the incident during which the system is being used.

Figure 5A:
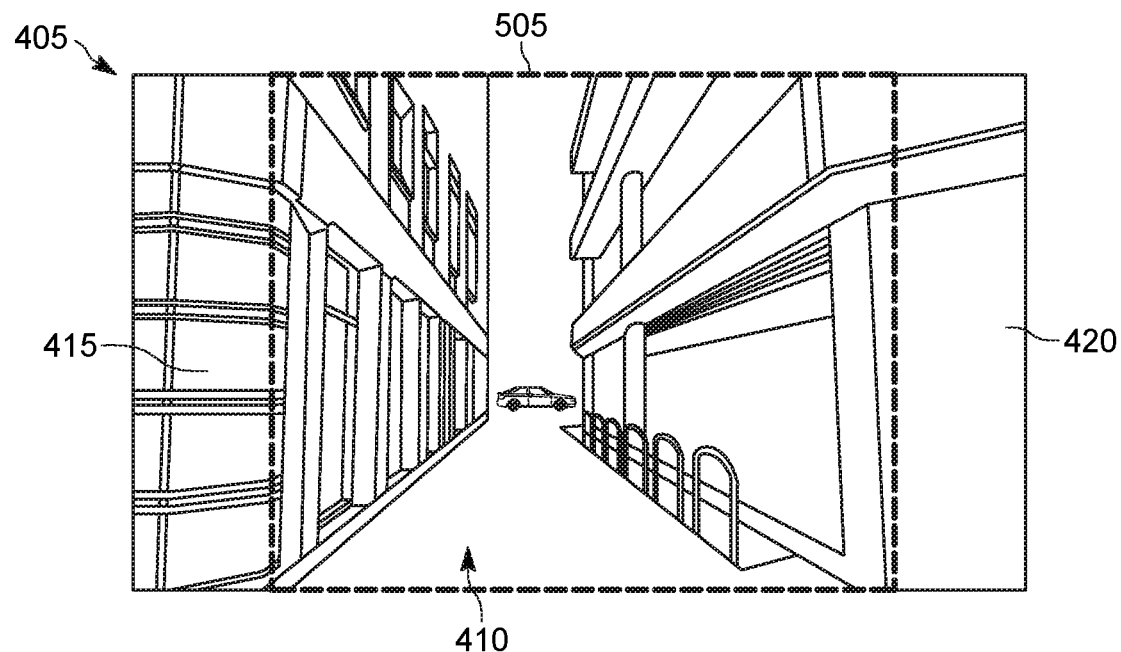
FIG. 5A illustrates an area within the field of view of FIG. 4A that is identified by an electronic processor of the vehicle of FIG. 1 during performance of the method of FIG. 3 in accordance with some embodiments.
Figure 5B:
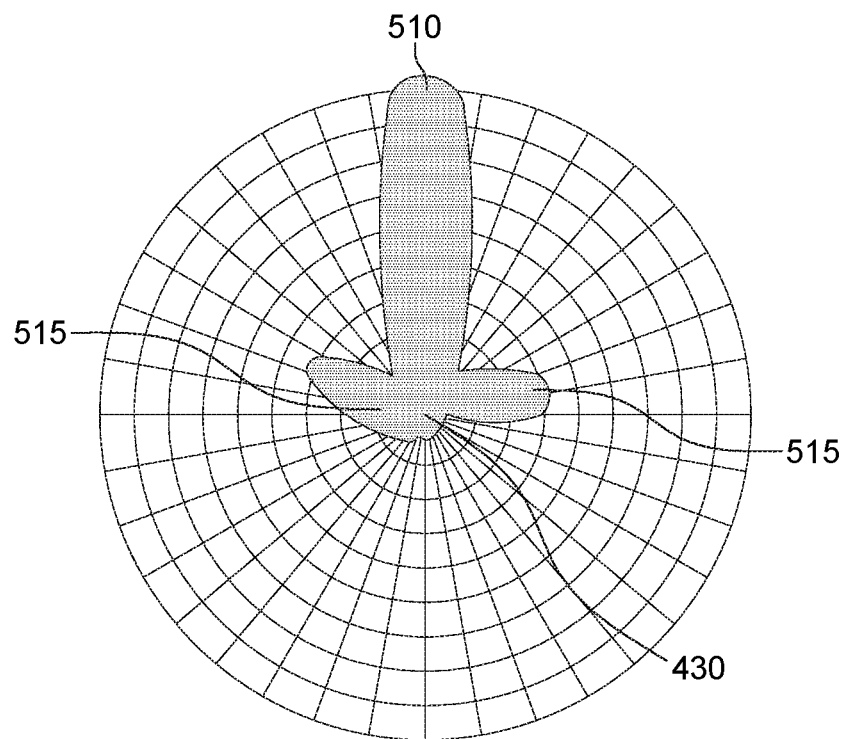
FIG. 5B illustrates a focused beam pattern emitted from the detection array of the range detection device of the vehicle of FIG. 1 to focus the beam on the identified area of FIG. 5A in accordance with some embodiments.

On the other hand, FIG. 5A illustrates an area 505 identified by the electronic processor 205 during execution of the method 300 that has a threat probability greater than the threat level threshold. As indicated in FIG. 5B, the electronic processor 205 sends an instruction to the range detection device associated with the camera to change a shape of the wide band beam pattern 425 created by the detection array to focus a beam pattern 510 in a direction of the identified area 505. Beamforming the beam pattern 510 in this manner provides longer distance coverage for the range detection device as indicated by the difference in forward distance coverage areas between the beam patterns 425 and 510 shown in FIGS. 4B and 5B, respectively. In other words, by using the focused beam pattern 510 of FIG. 5B, the range detection device is able to detect potential threats that are further away from the range detection device/vehicle 102 than when using the wide band beam pattern 425 of FIG. 4B.

In some embodiments, the detection array of the range detection device is controlled to emit weaker beams 515 toward the obstructed areas 415 and 420 to, for example, detect potential threats emerging from on a sidewalk next to the buildings. These weaker beams 515 do not need to have as long of a range/coverage area as the focused beam pattern 510 because the electronic processor 205 may determine that it is very unlikely (for example, a threat probability score of less than five) that a potential threat will approach the vehicle 102 by breaking through the obstructions 415 and 420. Accordingly, only a short coverage area of the weaker beams 515 may be necessary to adequately monitor the directions facing the obstructed areas 415 and 420 for potential threats. As illustrated by FIGS. 4A through 5B and the above corresponding explanation, the detection array of the range detection device may emit a beam with a changed shape to focus the beam in the direction of the identified area to at least one of (i) extend a measurable range of the detection array in the direction of the identified area (in other words, in the direction of an area with a threat probability above a threat level threshold) and (ii) reduce the measurable range of the detection array in a second direction different from the direction of the identified area (in other words, in the direction of an obstructed area). In some embodiments, reducing the measurable range of the detection array in the direction of an obstructed area reduces a processing load on the threat detection sensor system 120 and/or the electronic processor 205 by reducing the coverage area of the range detection device that provides range detection data to the threat detection sensor system 120 and/or the electronic processor 205 for analysis of a potential threat. Thus, the threat detection sensor system 120 and/or the electronic processor 205 may be able to detect threats more quickly by processing more relevant information more quickly.

Figure 6A:
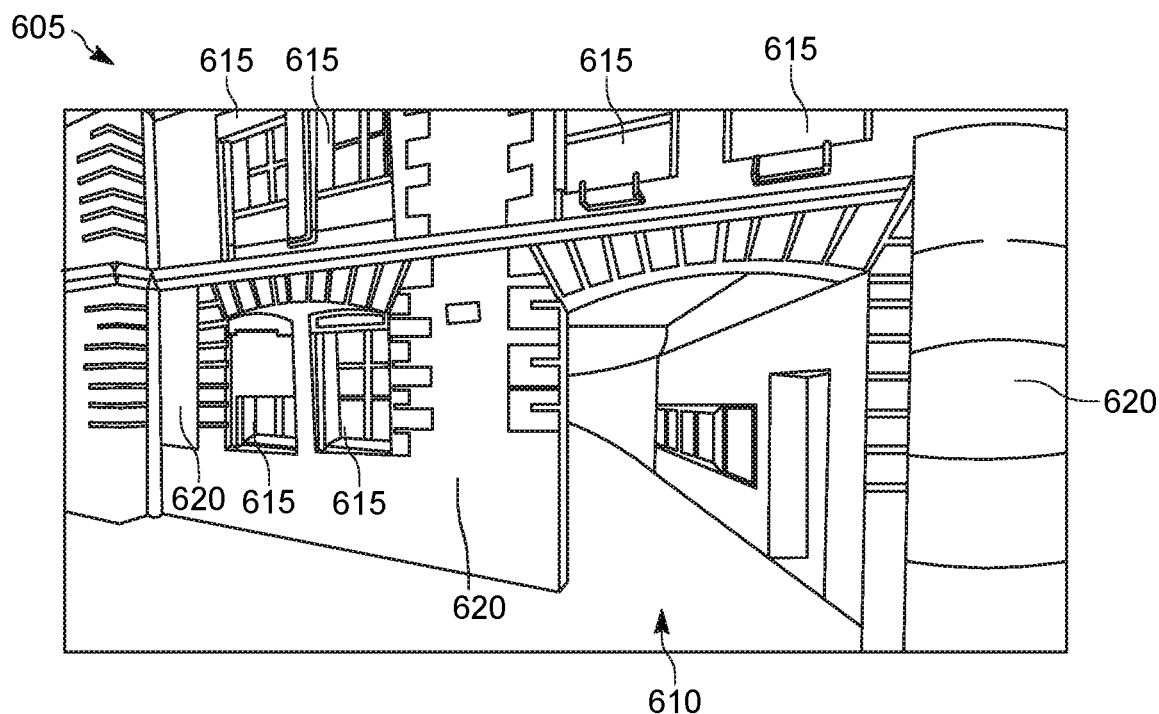
FIG. 6A illustrates another field of view of the camera of the vehicle of FIG. 1 in another example situation.
Figure 6B:
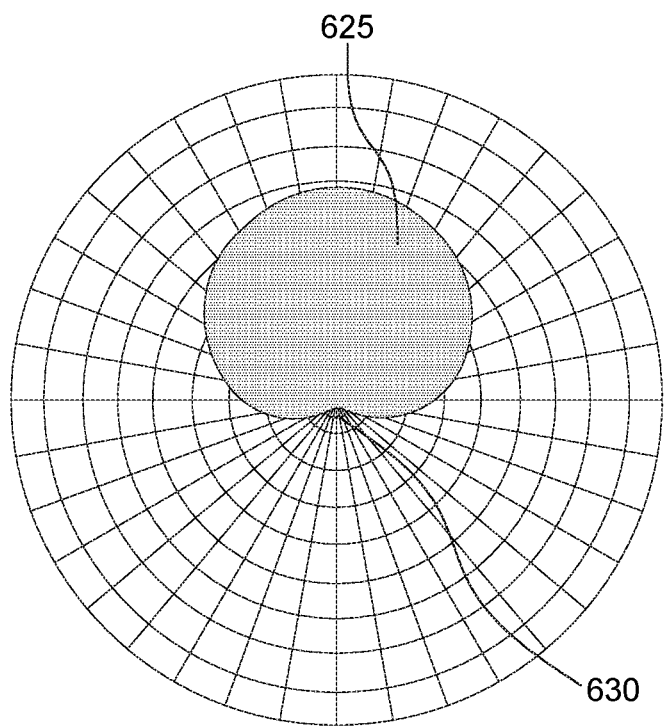
FIG. 6B illustrates another wide band beam pattern emitted from the detection array of the range detection device of the vehicle of FIG. 1 in accordance with some embodiments.

FIG. 6A illustrates another field of view 605 of a camera of the threat detection sensor system 120 according to another example situation. The field of view 605 includes a hallway 610, windows 615, and obstructions 620 (portions of a wall of a building). Similar to the previously-explained example of FIG. 4B, in existing threat detection sensor systems, a range detection device may emit a wide band beam pattern 625 from a location 630 of the range detection device as shown in FIG. 6B.

Figure 7B:
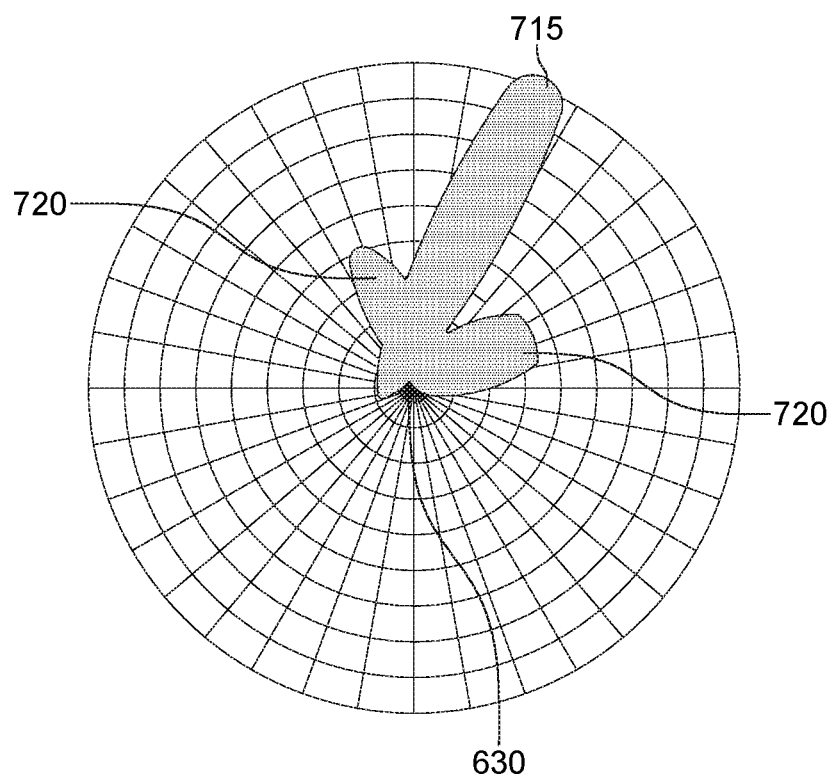
FIG. 7B illustrates a focused beam pattern emitted from the detection array of the range detection device of the vehicle of FIG. 1 to focus the beam on one of the identified areas of FIG. 7A in accordance with some embodiments.

On the other hand, FIG. 7A illustrates multiple areas 705 and 710 identified by the electronic processor 205 during execution of the method 300. As shown in FIG. 7A, the identified area 705 includes the opening of the hallway 610, and the identified areas 710 include the windows 615. As indicated in FIG. 7B, the electronic processor 205 sends an instruction to the range detection device associated with the camera to change a shape of the wide band beam pattern 625 created by the detection array to focus a beam pattern 715 in a direction of the identified area 705 including the opening to the hallway 610. In some embodiments, the electronic processor 205 sends the instruction to the range detection device while executing the method 300 to determine that the threat probability exceeds the threat level threshold (for example, in response to determining that a first threat probability of the area 705 is greater than second threat probabilities of the areas 710 by a predetermined amount). Beamforming the beam pattern 715 in this manner provides longer distance coverage for the range detection device as indicated by the difference in distance coverage areas in the direction of the area 705 between the beam patterns 625 and 715 shown in FIGS. 6B and 7B, respectively. In other words, by using the focused beam pattern 715 of FIG. 7B, the range detection device is able to detect potential threats that are further away from the range detection device/vehicle 102 than when using the wide band beam pattern 625 of FIG. 6B.

Similar to the above example shown in FIG. 5B, in some embodiments, the detection array of the range detection device is controlled to emit weaker beams 720 toward the obstructed areas 620 and/or toward other areas 710 that have a lower threat probability than the area 705. In some embodiments, weaker beams emitted toward the areas 710 including the windows 615 may have a greater coverage area and/or sensitivity than the weaker beams emitted toward the obstructions 620, for example, due to the electronic processor 205 determining that the threat probability of the areas 710 is greater than the threat probability of the obstructed areas 620 by a predetermined amount. As illustrated by FIGS. 6A through 7B and the above corresponding explanation, the detection array of the range detection device may emit a beam with a changed shape to focus the beam in the direction of the identified area with a highest threat probability in the field of view to at least one of (i) extend a measurable range of the detection array in the direction of the identified area with the highest threat probability and (ii) reduce the measurable range of the detection array in a second direction different from the direction of the identified area with the highest threat probability (in other words, in the direction of an obstructed area and/or in the direction of other areas that have a lower threat probability than the identified area with the highest threat probability).

Figure 8A:
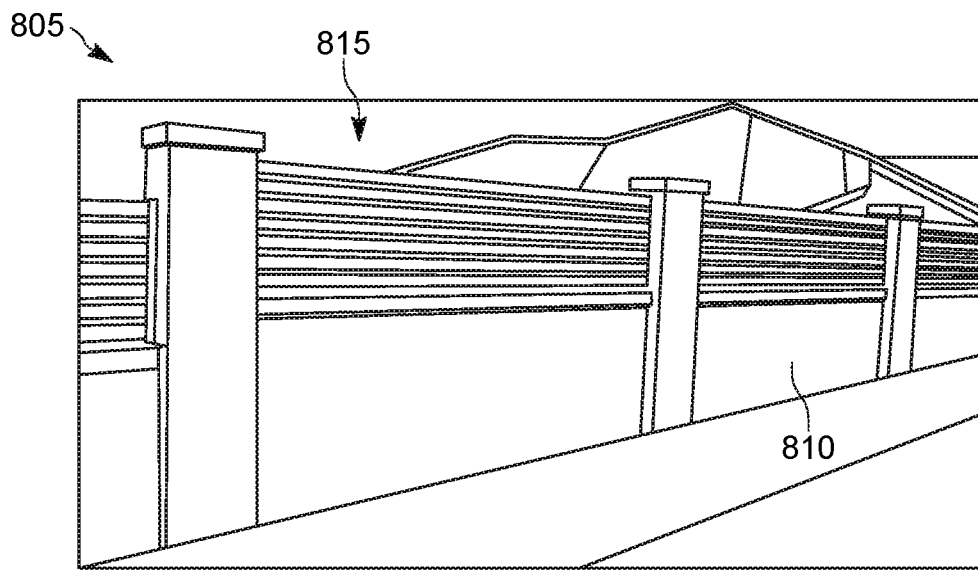
FIG. 8A illustrates another field of view of the camera of the vehicle of FIG. 1 in another example situation.
Figure 8B:
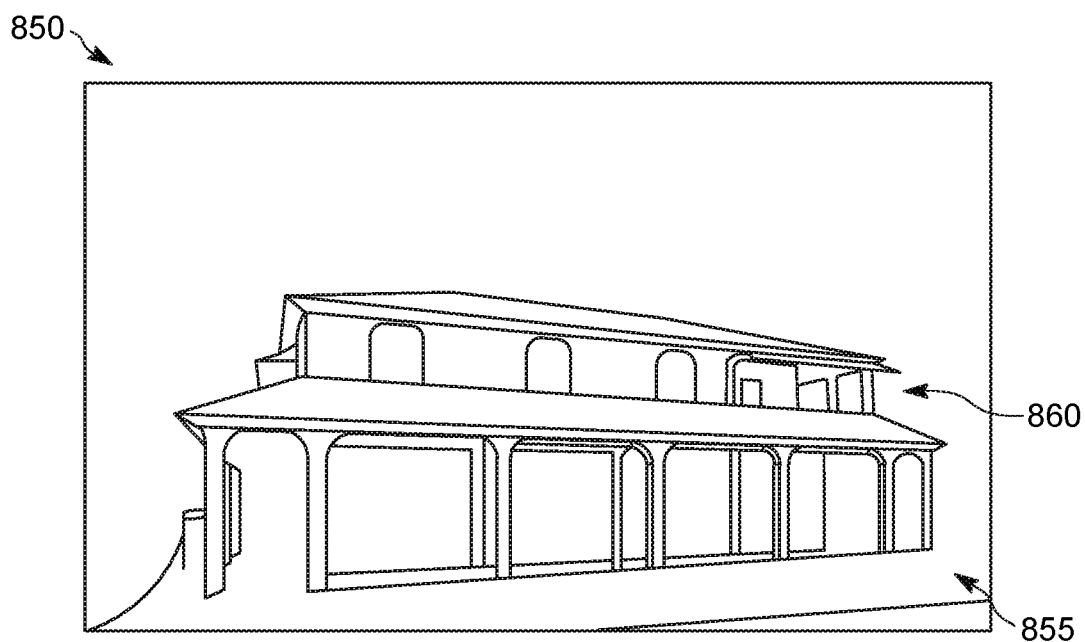
FIG. 8B illustrates yet another field of view of the camera of the vehicle of FIG. 1 in yet another example situation.
Figure 8C:
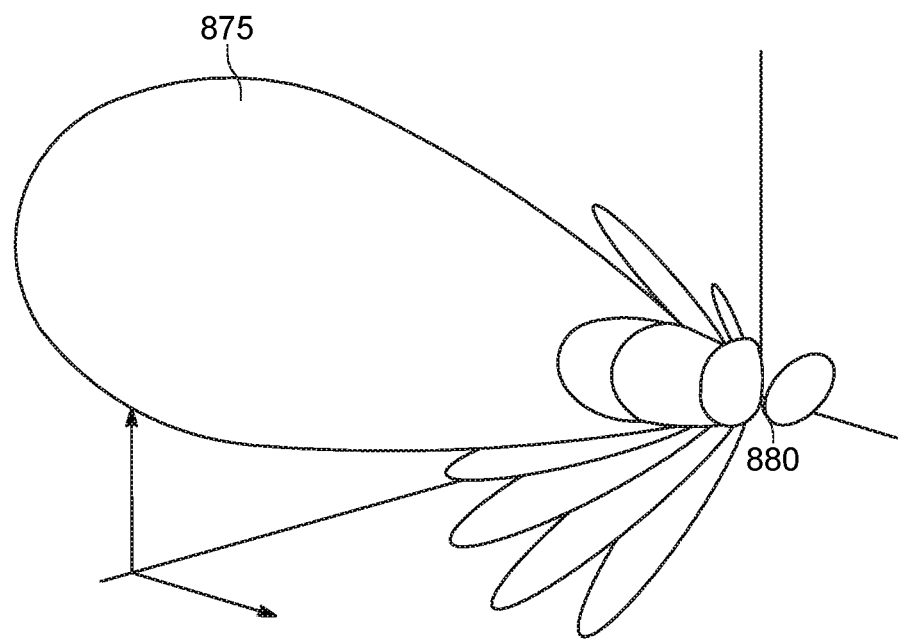
FIG. 8C illustrates another wide band beam pattern emitted from the detection array of the range detection device of the vehicle of FIG. 1 in accordance with some embodiments.

FIG. 8A illustrates another field of view 805 of a camera of the threat detection sensor system 120 according to another example situation. The field of view 805 includes an obstruction 810 (a fence or wall) and an open space 815 above the obstruction 810. FIG. 8B illustrates another field of view of 850 of the camera according to another example situation. The field of view 850 includes a heavily-trafficked area 855 where people, vehicles, or other moving objects may frequently be moving. While the heavily-trafficked area 855 is shown as a store front with a parking lot in front of the store, the heavily-trafficked area may be any other highly-trafficked area such as a road, sidewalk, other travel path, or the like. The field of view 850 of FIG. 8B also includes a less-trafficked area 860 that is a second story of a building in the example shown in FIG. 8B. Similar to the previously-explained examples of FIGS. 4B and 6B, in existing threat detection sensor systems, a range detection device may emit a wide band beam pattern 875 from a location 880 of the range detection device as shown in FIG. 8C.

Figure 9C:
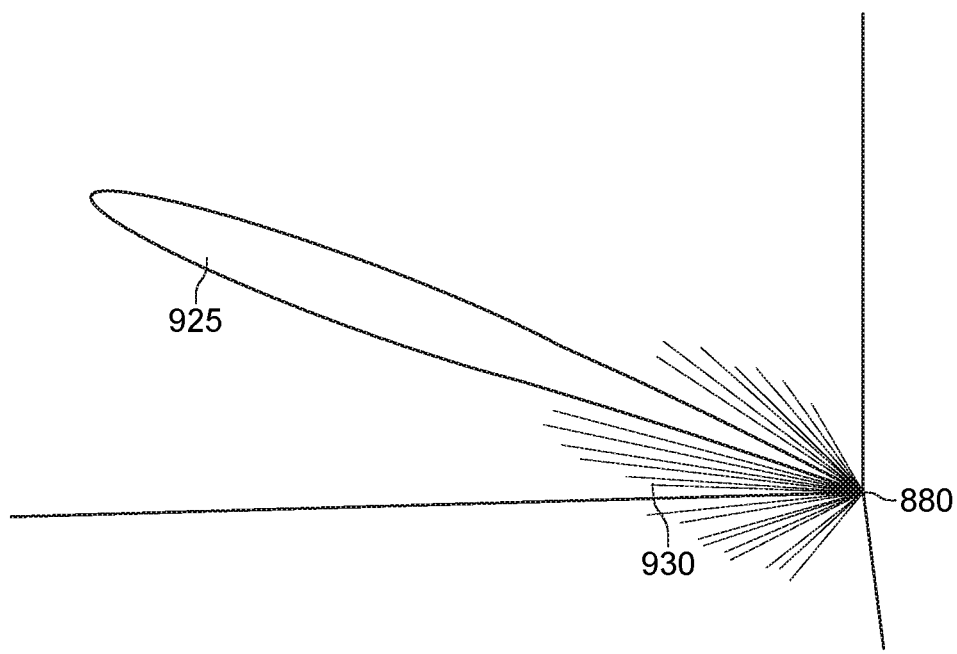
FIG. 9C illustrates a focused beam pattern emitted from the detection array of the range detection device of the vehicle of FIG. 1 to focus the beam on one of the identified areas of FIGS. 9A and 9B in accordance with some embodiments.

On the other hand, FIGS. 9A and 9B illustrate multiple areas 905, 910, 915, and 920 identified by the electronic processor 205 during execution of the method 300. As shown in FIG. 9A, the identified area 905 includes the open space 815 above the obstruction 810, and the identified area 910 includes the obstruction 810. As shown in FIG. 9B, the identified area 915 includes the less-trafficked area 860, and the identified area 920 includes the heavily-trafficked area 855. As indicated in FIG. 9C, in each of the situations shown in FIGS. 9A and 9B, the electronic processor 205 sends an instruction to the range detection device associated with the camera that provided each field of view 805, 850 to change a shape of the wide band beam pattern 875 created by the detection array to focus a beam pattern 925 in a direction of the identified areas 905 and 915. In some embodiments, the electronic processor 205 sends the instruction to the range detection device while executing the method 300 to determine that the threat probability exceeds the threat level threshold (for example, in response to determining that a first threat probability of the areas 905 and 915 are greater than a second threat probability of the areas 910 and 920, respectively, by a predetermined amount). Beamforming the beam pattern 925 in this manner provides longer distance coverage for the range detection device. In other words, by using the focused beam pattern 925 of FIG. 9C, the range detection device is able to detect potential threats that are further away from the range detection device/vehicle 102 than when using the wide band beam pattern 875 of FIG. 8C.

Similar to the above examples shown in FIGS. 5B and 7B, in some embodiments, the detection array of the range detection device is controlled to emit weaker beams 930 toward the areas 910 and 920. In some embodiments, the detection array may be controlled to prevent emission of any beams toward an area (for example, an identified area 920 that includes the heavily-trafficked area 855 of FIG. 9B). Reducing or eliminating the beams that are emitted toward the heavily-trafficked area 855 may improve system performance by preventing potential false positive indications of detected threats. For example, existing threat detection sensor systems may determine that many people are exiting the building shown in FIG. 9B and moving toward the vehicle 102. Thus, these existing threat detection sensor systems may provide many alerts to the officer 104 regarding potential threats such that when an actual threat is detected (for example, a person on the roof of the building or a sniper in the second story of the building), the officer 104 may not notice the alert involving the actual threat. Thus, preventing false positive indications of detected threats improves system accuracy and improves user experience. Additionally, reducing or eliminating the beams that are emitted toward the heavily-trafficked area 855 may also improve system performance by reducing a processing load on the threat detection sensor system 120 and/or the electronic processor 205 by reducing the coverage area of the range detection device that provides range detection data to the threat detection sensor system 120 and/or the electronic processor 205 for analysis of a potential threat. Thus, the threat detection sensor system 120 and/or the electronic processor 205 may be able to detect potential threats more quickly by processing more relevant information more quickly.

In some embodiments, a range detection device of the threat detection sensor system 120 may emit a default beam pattern (for example, a wide band beam pattern 425 or 625 as shown in FIGS. 4B and 6B) upon the vehicle 102 initially being parked. In some embodiments, through execution of the method 300, the electronic processor 205 determines that an area in the field of view in a direction that the range detection device is facing is a point of interest (for example, a window, a doorway, or the like as explained previously herein with respect to block 310). In some situations the area may be outside a current detection range of the range detection device. In other words, the area may be farther from the range detection device than the default beam pattern is configured to measure objects. In some embodiments, through execution of the method 300, the electronic processor 205 determines that the area is outside the current detection range of the range detection device and, in response, adjusts a shape of the beam emitted by the range detection device such that the area is included within an adjusted detection range as defined by the adjusted shape of the beam (for example, see focused beam patterns 510 and 710 of FIGS. 5B and 7B that have a longer detection range in the direction of an identified area than the respective wide band beam patterns 425 or 625 of FIGS. 4B and 6B).

Although the above explanation of the method 300 and the corresponding example use cases include identifying areas within the field of view of the camera based on image analysis and providing an instruction to the detection array of a range detection device to perform beamforming based on image analysis, in some embodiments, the electronic processor 205 provides the instruction to the detection array to perform beamforming, additionally or alternatively, based on a detected sound from a microphone of the vehicle 102. For example, the microphone is an external microphone configured to monitor sounds nearby the vehicle 102. In some embodiments, the electronic processor 205 receives, from the microphone, a signal indicative of a sound. The electronic processor 205 may identify a type of sound of the sound by performing audio analytics of the signal (for example, in a similar manner as described above with respect to using image analytics, such as using a neural network and training sounds with pre-identified types). For example, the type of sound may be identified as a gunshot, a person screaming, another sound that exceeds a predetermined decibel level, or the like. The electronic processor 205 may determine a threat level of the sound based on the identified type of sound and may determine that the threat level of the sound is greater than a sound threat level threshold. In response to determining that the threat level is greater than the sound threat level threshold, the electronic processor 205 may provide an instruction to the detection array to change the shape of the beam created by the detection array to focus the beam in a direction from which the microphone received the sound. In response to receiving the second instruction, the detection array emits the beam with the changed shape to focus the beam in the direction from which the microphone received the sound.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A detection system control device comprising:
a range detection device including a detection array; and
one or more electronic processors communicatively coupled to the detection array, wherein the one or more electronic processors are configured to
receive data from a camera, wherein the camera includes a field of view and the data includes at least one of an image and a video;
identify a first area in the field of view of the camera;
determine a first threat probability of the first identified area based on an area type of the first identified area;
determine that the first threat probability is greater than a threat level threshold; and
in response to determining that the first threat probability is greater than the threat level threshold, provide an instruction to the detection array to change a shape of a beam created by the detection array to focus the beam in a direction of the first identified area;
wherein in response to receiving the instruction, the detection array emits the beam with the changed shape to focus the beam in the direction of the first identified area.

2. The detection system control device of claim 1, wherein the one or more electronic processors are configured to identify the first area in the field of view by at least one of the group consisting of:
performing image analysis of the data; and
receiving a user input identifying the first area.

3. The detection system control device of claim 1, wherein the one or more electronic processors are configured to determine that the first threat probability is greater than the threat level threshold by:
identifying a second area in the field of view;
determining a second threat probability of the second identified area;
comparing the second threat probability of the second identified area to the first threat probability of the first identified area; and
determining that the first threat probability is greater than the second threat probability by a predetermined amount;
wherein in response to determining that the first threat probability is greater than the second threat probability by the predetermined amount, the one or more electronic processors are configured to provide the instruction to the detection array to change the shape of the beam created by the detection array to focus the beam in the direction of the first identified area.

4. The detection system control device of claim 1, wherein the detection array includes a plurality of antennas each configured to output a wave to create the beam, and wherein the detection array is configured to emit the beam with the changed shape to focus the beam in the direction of the identified area by at least one of the group consisting of:
mechanically moving at least one antenna of the plurality of antennas toward the direction of the identified area; and
electronically controlling a phase of the wave emitted by at least one antenna of the plurality of antennas.

5. The detection system control device of claim 1, wherein the one or more electronic processors include a first electronic processor and a second electronic processor;
wherein the first electronic processor is configured to receive the data from the camera,
identify the first area in the field of view by performing image analysis of the data,
generate metadata based on the image analysis of the data, the metadata indicating information about the first identified area, and
transmit the metadata to the second electronic processor;
wherein the second electronic processor is configured to receive the metadata from the first electronic processor,
determine the first threat probability of the first identified area based on the metadata,
determine that the first threat probability is greater than the threat level threshold, and
in response to determining that the first threat probability is greater than the threat level threshold, provide the instruction to the detection array to change the shape of the beam created by the detection array to focus the beam in the direction of the first identified area.

6. The detection system control device of claim 5, wherein the first electronic processor is included in at least one of the group consisting of a vehicular computing device mounted within or on a vehicle and a threat detection sensor system mounted within or on the vehicle; and
wherein the second electronic processor is included in at least one of the group consisting of the vehicular computing device and a cloud computing device.

7. The detection system control device of claim 1, wherein the detection array emits the beam with the changed shape to focus the beam in the direction of the first identified area to at least one of (i) extend a measurable range of the detection array in the direction of the first identified area and (ii) reduce the measurable range of the detection array in a second direction different from the direction of the first identified area.

8. The detection system control device of claim 1, wherein the one or more electronic processors are configured to determine the first threat probability of the first identified area based on at least one of the group consisting of:
a distance between the camera and the first identified area;
an object located in the first identified area; and
an incident type of an incident during which the detection system control device is being used.

9. The detection system control device of claim 1, wherein the detection array includes at least one of the group consisting of a radar array, a lidar array, and a sonar array.

10. The detection system control device of claim 1, further comprising a microphone configured to provide a signal indicative of a sound to the one or more electronic processors, wherein the one or more electronic processors are configured to:
receive the signal from the microphone;
identify a type of sound of the sound by performing audio analytics of the signal;
determine a threat level of the sound based on the identified type of sound;
determine that the threat level of the sound is greater than a sound threat level threshold; and
in response to determining that the threat level is greater than the sound threat level threshold, provide a second instruction to the detection array to change the shape of the beam created by the detection array to focus the beam in a second direction from which the microphone received the sound;
wherein in response to receiving the second instruction, the detection array emits the beam with the changed shape to focus the beam in the second direction from which the microphone received the sound.

11. The detection system control device of claim 1, further comprising the camera.

12. A method of controlling a detection system, the method comprising:
receiving, with one or more electronic processors coupled to a detection array of a range detection device, data from a camera, wherein the camera includes a field of view and the data includes at least one of an image and a video;
identifying, with the one or more electronic processors, a first area in the field of view of the camera;
determining, with the one or more electronic processors, a first threat probability of the first identified area based on an area type of the first identified area;
determining, with the one or more electronic processors, that the first threat probability is greater than a threat level threshold; and
in response to determining that the first threat probability is greater than the threat level threshold, providing, with the one or more electronic processors, an instruction to the detection array to change a shape of a beam created by the detection array to focus the beam in a direction of the first identified area;
wherein in response to receiving the instruction, the detection array emits the beam with the changed shape to focus the beam in the direction of the first identified area.

13. The method of claim 12, wherein identifying the first area in the field of view of the camera includes at least one of the group consisting of:
performing, with the one or more electronic processors, image analysis of the data; and
receiving, with the one or more electronic processors, a user input identifying the first area.

14. The method of claim 12, wherein determining that the first threat probability is greater than the threat level threshold includes:
identifying, with the one or more electronic processors, a second area in the field of view;
determining, with the one or more electronic processors, a second threat probability of the second identified area;
comparing, with the one or more electronic processors, the second threat probability of the second identified area to the first threat probability of the first identified area; and determining, with the one or more electronic processors, that the first threat probability is greater than the second threat probability by a predetermined amount;
wherein determining that the first threat probability is greater than the threat level threshold includes determining that the first threat probability is greater than the threat level threshold in response to determining that the first threat probability is greater than the second threat probability by the predetermined amount.

15. The method of claim 12, wherein the detection array includes a plurality of antennas each configured to output a wave to create the beam, and wherein providing, the instruction to the detection array to change the shape of the beam created by the detection array to focus the beam in the direction of the first identified area includes at least one of the group consisting of:
   mechanically controlling, with the one or more electronic processors, at least one antenna of the plurality of antennas to move toward the direction of the first identified area; and
   electronically controlling, with the one or more electronic processors, a phase of the wave emitted by at least one antenna of the plurality of antennas.

16. The method of claim 12, wherein the detection array emits the beam with the changed shape to focus the beam in the direction of the first identified area to at least one of (i) extend a measurable range of the detection array in the direction of the first identified area and (ii) reduce the measurable range of the detection array in a second direction different from the direction of the first identified area.

17. The method of claim 12, wherein determining the first threat probability of the first identified area includes determining the first threat probability of the first identified area based on at least one of the group consisting of:
   a distance between the camera and the first identified area;
   an object located in the identified first area; and
   an incident type of an incident during which the detection array is being used.

18. The method of claim 12, wherein the detection array includes at least one of the group consisting of a radar array, a lidar array, and a sonar array.

19. The method of claim 12, further comprising:
   generating, with a microphone, a signal indicative of a sound;
   receiving, with the one or more electronic processors, the signal from the microphone;
   identifying, with the one or more electronic processors, a type of sound of the sound by performing audio analytics of the signal;
   determining, with the one or more electronic processors, a threat level of the sound based on the identified type of sound;
   determining, with the one or more electronic processors, that the threat level of the sound is greater than a sound threat level threshold; and
   in response to determining that the threat level is greater than the sound threat level threshold, providing, with the one or more electronic processors, a second instruction to the detection array to change the shape of the beam created by the detection array to focus the beam in a second direction from which the microphone received the sound;
   wherein in response to receiving the second instruction, the detection array emits the beam with the changed shape to focus the beam in the second direction from which the microphone received the sound.

20. A detection system control device comprising:
   a camera configured to capture data, wherein the camera includes a field of view and the data includes at least one of an image and a video;
   a detection array; and
   one or more electronic processors communicatively coupled to the camera and the detection array, wherein the one or more electronic processors are configured to receive the data from the camera;
      identify a first area in the field of view and a second area in the field of view;
      determine a first threat probability of the first identified area based on a first area type of the first identified area and a second threat probability of the second identified area based on a second area type of the second identified area;
      determine that the first threat probability is greater than the second threat probability by a predetermined amount; and
      in response to determining that the first threat probability is greater than the second threat probability by the predetermined amount, provide an instruction to the detection array to change a shape of a beam created by the detection array to focus the beam in a first direction of the first identified area and away from a second direction of the second identified area;
   wherein in response to receiving the instruction, the detection array emits the beam with the changed shape to focus the beam in the first direction of the first identified area and away from the second direction of the second identified area.

* * * * *